US009029058B2

(12) United States Patent
Martin

(10) Patent No.: US 9,029,058 B2
(45) Date of Patent: May 12, 2015

(54) SOLUBLE SUPPORT MATERIAL FOR ELECTROPHOTOGRAPHY-BASED ADDITIVE MANUFACTURING

(71) Applicant: Stratasys, Inc., Eden Prairie, MN (US)

(72) Inventor: Trevor I. Martin, Burlington, CA (US)

(73) Assignee: Stratasys, Inc., Eden Prairie, MN (US)

( * ) Notice: Subject to any disclaimer, the term of this patent is extended or adjusted under 35 U.S.C. 154(b) by 78 days.

(21) Appl. No.: 13/944,478

(22) Filed: Jul. 17, 2013

(65) Prior Publication Data

US 2015/0024309 A1 Jan. 22, 2015

(51) Int. Cl.
G03G 9/08 (2006.01)
G03G 5/07 (2006.01)
G03G 13/18 (2006.01)
G03G 9/087 (2006.01)

(52) U.S. Cl.
CPC ............... *G03G 5/071* (2013.01); *G03G 13/18* (2013.01); *G03G 9/08711* (2013.01)

(58) Field of Classification Search
CPC .................................. G03G 9/08711
USPC ............................... 430/109.3, 133
See application file for complete search history.

(56) References Cited

U.S. PATENT DOCUMENTS

| 2,297,691 A | 10/1942 | Carlson |
| 4,988,602 A | 1/1991 | Jongewaard et al. |
| 5,088,047 A | 2/1992 | Bynum |
| 5,099,288 A | 3/1992 | Britto et al. |
| 5,254,421 A | 10/1993 | Coppens et al. |
| 5,354,414 A | 10/1994 | Feygin |
| 5,354,799 A | 10/1994 | Bennett et al. |
| 5,514,232 A | 5/1996 | Burns |
| 5,592,266 A | 1/1997 | Park et al. |
| 5,593,531 A | 1/1997 | Penn |
| 5,594,652 A | 1/1997 | Penn et al. |
| 5,866,058 A | 2/1999 | Batchelder et al. |
| 5,981,616 A | 11/1999 | Yamamura et al. |
| 5,990,268 A | 11/1999 | Dickens, Jr. et al. |

(Continued)

FOREIGN PATENT DOCUMENTS

| CN | 101310964 | 11/2008 |
| EP | 0306133 A1 | 3/1989 |

(Continued)

OTHER PUBLICATIONS

"Xerography", Aug. 27, 2010, pp. 1-4, http:/en.wikipedia.org/wiki/Xerography.

(Continued)

*Primary Examiner* — Mark A Chapman
(74) *Attorney, Agent, or Firm* — Westman, Champlin & Koehler, P.A.

(57) ABSTRACT

A support material for printing a support structure with an electrophotography-based additive manufacturing system, the support material including a composition having a charge control agent and a thermoplastic copolymer having aromatic groups, (meth)acrylate-based ester groups, carboxylic acid groups, and anhydride groups, with a high anhydride conversion. The composition is provided in a powder form having a controlled particle size, and the support material is configured for use in the electrophotography-based additive manufacturing system having a layer transfusion assembly for printing the support structure in a layer-by-layer manner, and is at least partially soluble in an aqueous solution.

20 Claims, 9 Drawing Sheets

(56) References Cited

U.S. PATENT DOCUMENTS

| | | |
|---|---|---|
| 6,052,551 A | 4/2000 | De Cock et al. |
| 6,066,285 A | 5/2000 | Kumar |
| 6,169,605 B1 | 1/2001 | Penn et al. |
| 6,206,672 B1 | 3/2001 | Grenda |
| 6,329,115 B1 | 12/2001 | Yamashita |
| 6,376,148 B1 | 4/2002 | Liu et al. |
| 6,509,128 B1 | 1/2003 | Everaerts et al. |
| 6,531,086 B1 | 3/2003 | Larsson |
| 6,780,368 B2 | 8/2004 | Liu et al. |
| 6,799,959 B1 | 10/2004 | Tochimoto et al. |
| 6,815,636 B2 | 11/2004 | Chung et al. |
| 6,887,640 B2 | 5/2005 | Zhang et al. |
| 7,011,783 B2 | 3/2006 | Fong |
| 7,077,638 B2 | 7/2006 | Leyden et al. |
| 7,208,257 B2 | 4/2007 | Cheng et al. |
| 7,261,541 B2 | 8/2007 | Fong |
| 7,261,542 B2 | 8/2007 | Hickerson et al. |
| 7,291,242 B2 | 11/2007 | Khoshnevis |
| 7,435,763 B2 | 10/2008 | Farr et al. |
| 7,815,826 B2 | 10/2010 | Serdy et al. |
| 7,988,906 B2 | 8/2011 | Monsheimer et al. |
| 8,047,251 B2 | 11/2011 | Khoshnevis |
| 8,119,053 B1 | 2/2012 | Bedal et al. |
| 8,123,999 B2 | 2/2012 | Priedeman, Jr. et al. |
| 8,124,192 B2 | 2/2012 | Paasche et al. |
| 8,147,910 B2 | 4/2012 | Kritchman |
| 8,173,258 B2 | 5/2012 | Monsheimer et al. |
| 8,216,757 B2 | 7/2012 | Mizutani et al. |
| 8,221,671 B2 | 7/2012 | Hull et al. |
| 8,246,888 B2 | 8/2012 | Hopkins et al. |
| 8,249,480 B2 | 8/2012 | Aslam et al. |
| 8,459,280 B2 | 6/2013 | Swanson et al. |
| 2002/0093115 A1 | 7/2002 | Jang et al. |
| 2002/0145213 A1 | 10/2002 | Liu et al. |
| 2003/0087176 A1 | 5/2003 | Ezenyilimba et al. |
| 2004/0232583 A1 | 11/2004 | Monsheimer et al. |
| 2005/0014084 A1 | 1/2005 | Ohmura et al. |
| 2005/0207801 A1 | 9/2005 | Kunii et al. |
| 2005/0218549 A1 | 10/2005 | Farr et al. |
| 2008/0032083 A1 | 2/2008 | Serdy et al. |
| 2008/0169585 A1 | 7/2008 | Zinniel |
| 2008/0169589 A1 | 7/2008 | Sperry et al. |
| 2008/0171284 A1 | 7/2008 | Hull et al. |
| 2008/0226346 A1 | 9/2008 | Hull et al. |
| 2009/0236775 A1 | 9/2009 | Monsheimer et al. |
| 2011/0117485 A1 | 5/2011 | Hermann et al. |
| 2011/0186081 A1 | 8/2011 | Dunn et al. |
| 2012/0041132 A1 | 2/2012 | Monsheimer et al. |
| 2012/0139167 A1 | 6/2012 | Fruth et al. |
| 2012/0201960 A1 | 8/2012 | Hartmann et al. |
| 2012/0202012 A1 | 8/2012 | Grebe et al. |
| 2012/0237870 A1 | 9/2012 | Watanabe et al. |
| 2012/0263488 A1 | 10/2012 | Aslam et al. |
| 2012/0274002 A1 | 11/2012 | Uchida |
| 2013/0077996 A1 | 3/2013 | Hanson et al. |
| 2013/0077997 A1 | 3/2013 | Hanson et al. |
| 2013/0171434 A1 | 7/2013 | Hirth et al. |

FOREIGN PATENT DOCUMENTS

| | | |
|---|---|---|
| EP | 0712051 | 5/1996 |
| EP | 2109009 A1 | 10/2009 |
| EP | 2514775 A1 | 10/2012 |
| GB | 1437176 A | 5/1976 |
| GB | 2446386 | 8/2008 |
| JP | 5165350 | 7/1993 |
| JP | 8281808 | 10/1996 |
| JP | 2001075376 | 3/2001 |
| JP | 2002347129 | 12/2002 |
| JP | 2003053849 | 2/2003 |
| JP | 2003071940 | 3/2003 |
| JP | 2005062860 | 3/2005 |
| JP | 2006182813 | 7/2006 |
| WO | 9851464 | 11/1998 |
| WO | 2007114895 | 10/2007 |
| WO | 2011065920 | 6/2011 |
| WO | 2012/034666 A1 | 3/2012 |

OTHER PUBLICATIONS

Jones, Jason, "Selective Laser Printing", Published Prior to Jan. 14, 2013, 1 page.

International Search Report and Written Opinion dated Oct. 30, 2014 for corresponding International Patent Application No. PCT/US2014/046800, filed Jul. 16, 2014.

SOLUBLE SUPPORT MATERIAL FOR ELECTROPHOTOGRAPHY-BASED ADDITIVE MANUFACTURING

BACKGROUND

The present disclosure relates to additive manufacturing systems for printing three-dimensional (3D) parts and support structures. In particular, the present disclosure relates to consumable materials for printing 3D parts and support structures using an imaging process, such as electrophotography.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (i.e., xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where toner is applied to charged areas, or alternatively to discharged areas of the photoconductive insulator to form visible images. The formed toner images are then transferred to substrates (e.g., printing paper) and affixed to the substrates with heat and/or pressure.

SUMMARY

An aspect of the present disclosure is directed to a support material for printing a support structure with an electrophotography-based additive manufacturing system. The support material includes a composition having a charge control agent and a copolymer with aromatic groups, (meth)acrylate-based ester groups, carboxylic acid groups, and anhydride groups, with a high anhydride conversion. The composition is provided in a powder form having a controlled particle size (e.g., a D50 particle size ranging from about 5 micrometers to about 30 micrometers), and the support material is configured for use in the electrophotography-based additive manufacturing system having a layer transfusion assembly for printing the support structures in a layer-by-layer manner, preferably in coordination with the printing of 3D parts, is at least partially soluble in an aqueous solution (e.g., an aqueous alkaline solution).

In some embodiments, the above-discussed support material may be provided in an interchangeable cartridge or other similar device, along with carrier particles, for use with the electrophotography-based additive manufacturing systems.

Another aspect of the present disclosure is directed to a method for manufacturing a support material for use in an electrophotography-based additive manufacturing system. The method includes polymerizing monomers comprising one or more ethylenically-unsaturated aromatic monomers, one or more alkyl(meth)acrylate monomers, and one or more (meth)acrylic acid monomers, to produce a thermoplastic copolymer in acid form, which comprises aromatic groups, (meth)acrylate-based ester groups, and carboxylic acid groups. The method also includes heating the thermoplastic copolymer in acid form to convert a portion of the carboxylic acid groups to anhydride groups with an anhydride conversion that is at least 90% of a maximum anhydride conversion for the thermoplastic copolymer, thereby producing a thermoplastic copolymer in anhydride form. The method further includes blending a charge control agent to the thermoplastic copolymer in anhydride form, and forming the blend into a powder form having a D50 particle size ranging from about 5 micrometers to about 30 micrometers.

Another aspect of the present disclosure is directed to a method for printing a support structure with an electrophotography-based additive manufacturing system having an electrophotography engine, a transfer medium, and a layer transfusion assembly. The method includes providing a support material to the electrophotography-based additive manufacturing system, where the support material compositionally includes a charge control agent and a thermoplastic copolymer having aromatic groups, (meth)acrylate-based ester groups, carboxylic acid groups, and anhydride groups, and with a high anhydride conversion, and where the support material is provided in a powder form.

The method also includes triboelectrically charging the support material to a desired triboelectric charge (e.g., a Q/M ratio having a negative charge or a positive charge, and a magnitude ranging from about 5 micro-Coulombs/gram to about 50 micro-Coulombs/gram), and developing layers of the support structure from the charged support material with the electrophotography engine. The method further includes electrostatically attracting the developed layers from the electrophotography engine to the transfer medium, moving the attracted layers to the layer transfusion assembly with the transfer medium, and transfusing the moved layers to previously-printed layers of the support structure with the layer transfusion assembly.

Definitions

Unless otherwise specified, the following terms as used herein have the meanings provided below:

The term "copolymer" refers to a polymer having two or more monomer species, and includes terpolymers (i.e., copolymers having three monomer species).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" styrene-butyl acrylate-methacrylic acid copolymer is interpreted to include one or more polymer molecules of the copolymer, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one copolymer", "one or more copolymers", and "copolymer(s)" may be used interchangeably and have the same meaning.

The term "(meth)acrylate" includes acrylate, methacrylate, and/or a combination thereof. Similarly, the term "(meth)acrylic acid" includes acrylic acid, methacrylic acid, and/or a combination thereof.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
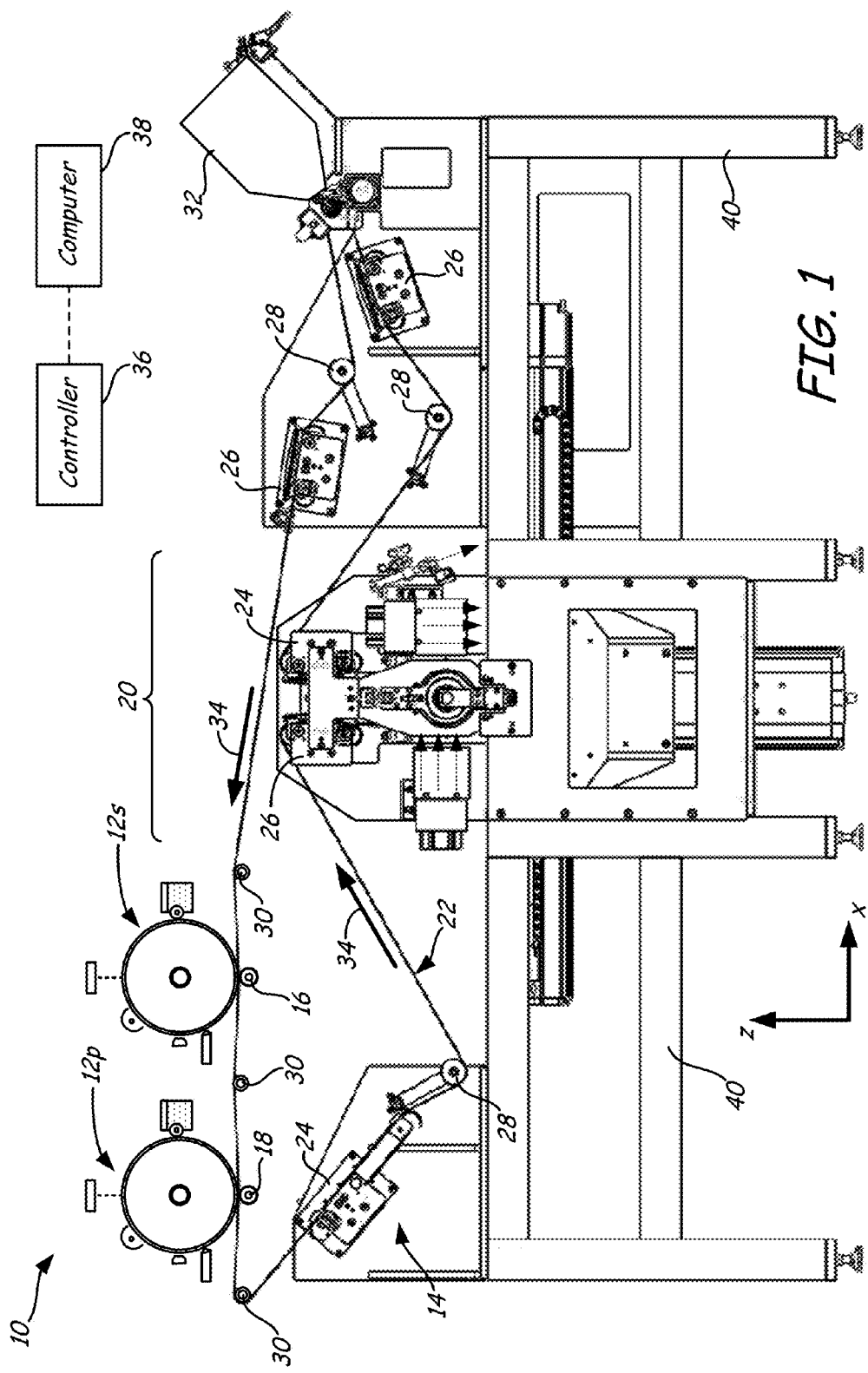
FIG. 1 is a front view of an example electrophotography-based additive manufacturing system for printing 3D parts and support structures from part and support materials of the present disclosure.

The present disclosure is directed to a sacrificial soluble support material, which is molecularly engineered for use in an electrophotography-based additive manufacturing system to print support structures, in association with a part material used to print 3D parts, with high resolutions and fast printing rates. During a printing operation, electrophotography (EP) engines may develop or otherwise image each layer of the part and support materials using the electrophotographic process. The developed layers are then transferred to a layer transfusion assembly where they are transfused (e.g., using heat and/or pressure) to print one or more 3D parts and support structures in a layer-by-layer manner.

In comparison to 2D printing, in which developed toner particles can be electrostatically transferred to printing paper by placing an electrical potential through the printing paper, the multiple printed layers in a 3D environment effectively prevents the electrostatic transfer of part and support materials after a given number of layers are printed (e.g., about 15 layers). Instead, each layer may be heated to an elevated transfer temperature, and then pressed against a previously-printed layer (or to a build platform) to transfuse the layers together in a transfusion step. This allows numerous layers of 3D parts and support structures to be built vertically, beyond what is otherwise achievable via electrostatic transfers.

As discussed below, the support material of the present disclosure is a powder-based, soluble support material that is engineered for use in electrophotography-based additive manufacturing system, and to complement a suitable part material (e.g., thermoplastic-based part materials), such as an acrylonitrile-butadiene-styrene (ABS) part material. The support material is particularly suitable for use with the ABS part material disclosed in co-filed U.S. patent application Ser. No. 13/944,472, entitled "ABS Part Material For Electrophotography-Based Additive Manufacturing", the disclosure of which is incorporated by reference to the extent that it does not conflict with the present disclosure.

The support material functions as sacrificial material for the part material, and is desirable in cases where overhanging features are required in the final 3D part structure, where significant angular slopes exist in the 3D part, where it is essential to also preserve delicate features in the 3D part, such as small orifices or controlled pore structures, and in some situations, to laterally encase the 3D part. Once the 3D part has been printed, the support structure of the sacrificial support material may be removed to reveal the completed 3D part, preferably without damaging any of the critical or delicate geometrical features of the 3D part. To accomplish this, the support material is soluble in an aqueous solution, such as an aqueous alkaline solution, allowing the support structure to be dissolved away from the 3D part.

These requirements, however, have imparted significant challenges in producing a support material that is suitable for use in an electrophotography-based additive manufacturing system. For example, as discussed below, each layer of the support material is preferably transfused along with an associated layer of the part material. As such, the support material also preferably has thermal properties (e.g., a glass transition temperature) and a melt rheology that are similar to, or more preferably, substantially the same as the thermal properties and melt rheology of its associated part material.

Moreover, the support material is preferably capable of accepting and maintaining a stable triboelectric charge that is similar to, or more preferably, substantially the same as that of the associated part material to allow the part and support materials to be transferred to the layer transfusion assembly together. Furthermore, the support material is preferably capable of being produced in a powder-form using a cost-efficient processing technique, preferably exhibits good adhesion to the part material, and is preferably thermally stable during a layer transfusion process.

Accordingly, the support material of the present disclosure has been developed to balance these competing factors. Briefly, the support material compositionally includes a thermoplastic copolymer, a charge control agent, and optionally, a heat absorber and/or one or more additional materials, such as a flow control agent. The thermoplastic copolymer includes aromatic groups, (meth)acrylate-based ester groups, carboxylic acid groups, and anhydride groups, where a ratio of the anhydride groups-to-carboxylic acid groups is preferably maximized or otherwise increased in favor of anhydride conversion for the copolymer.

A preferred thermoplastic copolymer for the support material is a terpolymer derived from one or more ethylenically-unsaturated aromatic monomers (e.g., styrene), one or more alkyl(meth)acrylate monomers (e.g., butyl acrylate), and one or more (meth)acrylic acid monomers (e.g., methacrylic acid), where carboxylic acid groups from the one or more (meth)acrylic acid monomers are preferably converted intramolecularly to anhydride groups to the fullest extent possible.

It has been found that if the anhydride conversion is not substantially or fully maximized, the carboxylic acid groups of the support material can undergo further anhydride conversion during the layer transfusion step, which can result in foaming and bubbling. The foaming and bubbling can accordingly result in a loss of support structure and part quality. This is in comparison to extrusion-based additive manufacturing techniques incorporating support materials of soluble thermoplastic copolymers, which typically have substantially lower anhydride conversions. Furthermore, the support material also preferably has good adhesion to the part material layers to effectively support the part material layers during the printing operation, while also being soluble in an aqueous-based solution for sacrificial removal in a post-printing removal step.

FIGS. 1-4 illustrate system 10, which is an example electrophotography-based additive manufacturing system for printing 3D parts from a part material (e.g., an ABS part material), and associated support structures from the support material of the present disclosure. As shown in FIG. 1, system 10 includes a pair of EP engines 12p and 12s, belt transfer assembly 14, biasing mechanisms 16 and 18, and layer transfusion assembly 20. Examples of suitable components and functional operations for system 10 include those disclosed in Hanson et al., U.S. Publication Nos. 2013/0077996 and 2013/0077997, and in Comb et al., U.S. patent application Ser. Nos. 13/790,382 and 13/790,406.

EP engines 12p and 12s are imaging engines for respectively imaging or otherwise developing layers of the part and support materials, where the part and support materials are each preferably engineered for use with the particular architecture of EP engine 12p or 12s. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

System 10 also includes controller 36, which is one or more control circuits, microprocessor-based engine control systems, and/or digitally-controlled raster imaging processor systems, and which is configured to operate the components of system 10 in a synchronized manner based on printing instructions received from host computer 38. Host computer 38 is one or more computer-based systems configured to communicate with controller 36 to provide the print instructions (and other operating information). For example, host computer 38 may transfer information to controller 36 that relates to the sliced layers of the 3D parts and support structures, thereby allowing system 10 to print the 3D parts and support structures in a layer-by-layer manner.

The components of system 10 may be retained by one or more frame structures, such as frame 40. Additionally, the components of system 10 are preferably retained within an enclosable housing (not shown) that prevents ambient light from being transmitted to the components of system 10 during operation.

Figure 2:
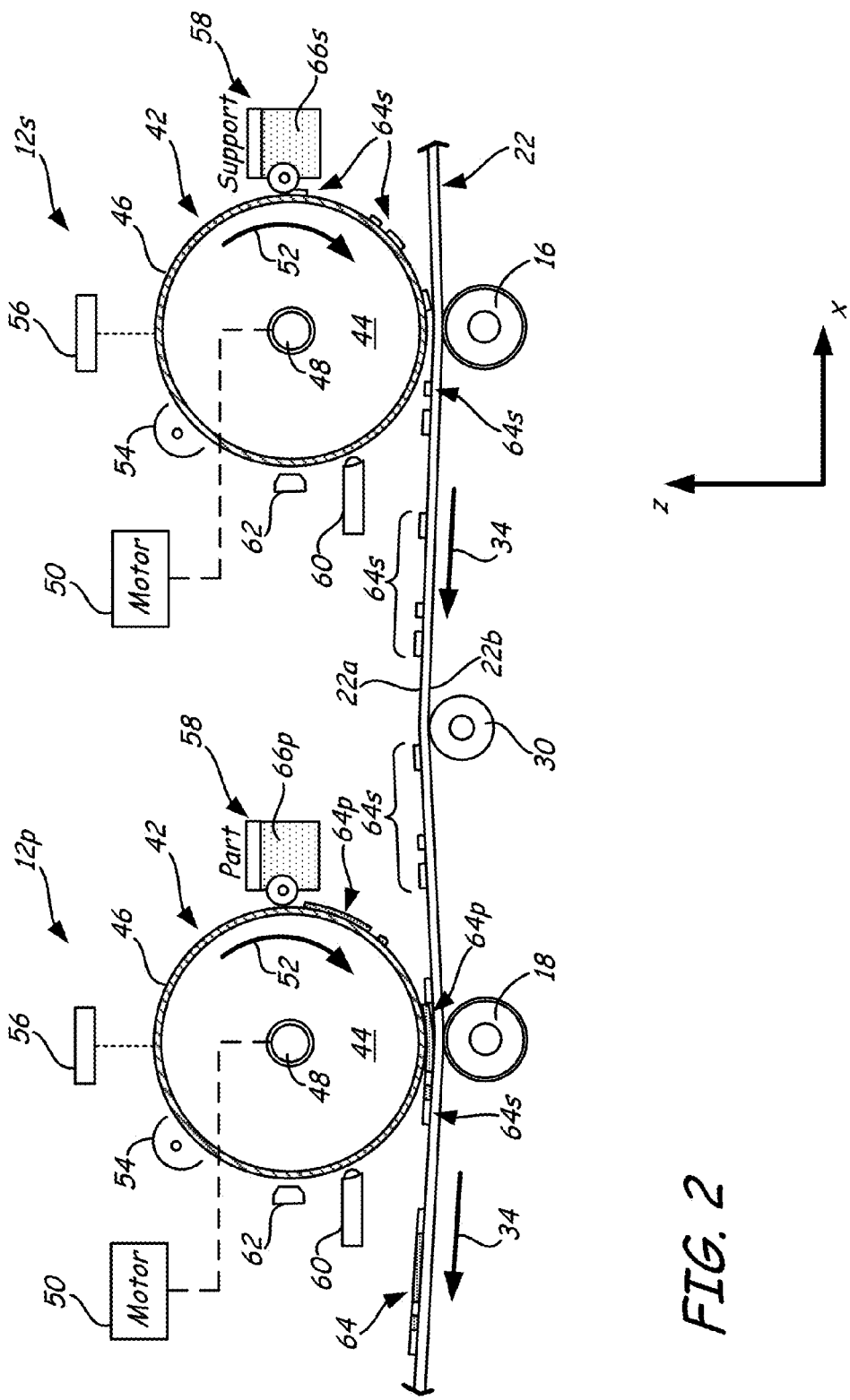
FIG. 2 is a schematic front view of a pair of electrophotography engines of the system for developing layers of the part and support materials.

FIG. 2 illustrates EP engines 12p and 12s, where EP engine 12s (i.e., the upstream EP engine relative to the rotational direction of belt 22) develops layers of the support material, and EP engine 12p (i.e., the downstream EP engine relative to the rotational direction of belt 22) develops layers of the part material. In alternative embodiments, the arrangement of EP engines 12p and 12s may be reversed such that EP engine 12p is upstream from EP engine 12s relative to the rotational direction of belt 22. In further alternative embodiments, system 10 may include three or more EP engines for printing layers of additional materials.

In the shown embodiment, EP engines 12p and 12s may include the same components, such as photoconductor drum 42 having conductive drum body 44 and photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate shaft 48 (and photoconductor drum 42) in the direction of arrow 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, surface 46 is configured to receive latent-charged images of the sliced layers of a 3D part or support structure (or negative images), and to attract charged particles of the part or support material of the present disclosure to the charged or discharged image areas, thereby creating the layers of the 3D part or support structure.

As further shown, EP engines 12*p* and 12*s* also includes charge inducer 54, imager 56, development station 58, cleaning station 60, and discharge device 62, each of which may be in signal communication with controller 36. Charge inducer 54, imager 56, development station 58, cleaning station 60, and discharge device 62 accordingly define an image-forming assembly for surface 46 while drive motor 50 and shaft 48 rotate photoconductor drum 42 in the direction of arrow 52.

In the shown example, the image-forming assembly for surface 46 of EP engine 12*s* is used to form layers 64*s* of the support material (referred to as support material 66*s*), where a supply of support material 66*s* may be retained by development station 58 (of EP engine 12*s*) along with carrier particles. Similarly, the image-forming assembly for surface 46 of EP engine 12*p* is used to form layers 64*p* of the part material (referred to as part material 66*p*), where a supply of part material 66*p* may be retained by development station 58 (of EP engine 12*p*) along with carrier particles.

Charge inducer 54 is configured to generate a uniform electrostatic charge on surface 46 as surface 46 rotates in the direction of arrow 52 past charge inducer 54. Suitable devices for charge inducer 54 include corotrons, scorotrons, charging rollers, and other electrostatic charging devices.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 is directed by controller 36, and causes discrete pixel-wise locations of the electrostatic charge to be removed (i.e., discharged to ground), thereby forming latent image charge patterns on surface 46.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

Each development station 58 is an electrostatic and magnetic development station or cartridge that retains the supply of part material 66*p* or support material 66*s*, preferably in powder form, along with carrier particles. Development stations 58 may function in a similar manner to single or dual component development systems and toner cartridges used in 2D electrophotography systems. For example, each development station 58 may include an enclosure for retaining the part material 66*p* or support material 66*s* and carrier particles. When agitated, the carrier particles generate triboelectric charges to attract the powders of the part material 66*p* or support material 66*s*, which charges the attracted powders to a desired sign and magnitude, as discussed below.

Each development station 58 may also include one or more devices for transferring the charged part material 66*p* or support material 66*s* to surface 46, such as conveyors, fur brushes, paddle wheels, rollers, and/or magnetic brushes. For instance, as surface 46 (containing the latent charged image) rotates from imager 56 to development station 58 in the direction of arrow 52, the charged part material 66*p* or support material 66*s* is attracted to the appropriately charged regions of the latent image on surface 46, utilizing either charged area development or discharged area development (depending on the electrophotography mode being utilized). This creates successive layers 64*p* or 64*s* as photoconductor drum 12 continues to rotate in the direction of arrow 52, where the successive layers 64*p* or 64*s* correspond to the successive sliced layers of the digital representation of the 3D part or support structure.

The successive layers 64*p* or 64*s* are then rotated with surface 46 in the direction of arrow 52 to a transfer region in which layers 64*p* or 64*s* are successively transferred from photoconductor drum 42 to belt 22, as discussed below. While illustrated as a direct engagement between photoconductor drum 42 and belt 22, in some preferred embodiments, EP engines 12*p* and 12*s* may also include intermediary transfer drums and/or belts, as discussed further below.

After a given layer 64*p* or 64*s* is transferred from photoconductor drum 42 to belt 22 (or an intermediary transfer drum or belt), drive motor 50 and shaft 48 continue to rotate photoconductor drum 42 in the direction of arrow 52 such that the region of surface 46 that previously held the layer 64*p* or 64*s* passes cleaning station 60. Cleaning station 60 is a station configured to remove any residual, non-transferred portions of part or support material 66*p* or 66*s*. Suitable devices for cleaning station 60 include blade cleaners, brush cleaners, electrostatic cleaners, vacuum-based cleaners, and combinations thereof.

After passing cleaning station 60, surface 46 continues to rotate in the direction of arrow 52 such that the cleaned regions of surface 46 pass discharge device 62 to remove any residual electrostatic charge on surface 46, prior to starting the next cycle. Suitable devices for discharge device 62 include optical systems, high-voltage alternating-current corotrons and/or scorotrons, one or more rotating dielectric rollers having conductive cores with applied high-voltage alternating-current, and combinations thereof.

Transfer belt 22 is a transfer medium for transferring the developed successive layers 64*p* and 64*s* from photoconductor drum 42 (or an intermediary transfer drum or belt) to layer transfusion assembly 16. Examples of suitable transfer belts for belt 22 include those disclosed in Comb et al., U.S. patent application Ser. Nos. 13/790,382 and 13/790,406. Belt 22 includes front surface 22*a* and rear surface 22*b*, where front surface 22*a* faces surfaces 46 of photoconductor drums 42 and rear surface 22*b* is in contact with biasing mechanisms 16 and 18.

Biasing mechanisms 16 and 18 are configured to induce electrical potentials through belt 22 to electrostatically attract layers 64*p* and 64*s* from EP engines 12*p* and 12*s* to belt 22. Because layers 64*p* and 64*s* are each only a single layer increment in thickness at this point in the process, electrostatic attraction is suitable for transferring layers 64*p* and 64*s* from EP engines 12*p* and 12*s* to belt 22.

Controller 36 preferably rotates photoconductor drums 36 of EP engines 12*p* and 12*s* at the same rotational rates that are synchronized with the line speed of belt 22 and/or with any intermediary transfer drums or belts. This allows system 10 to develop and transfer layers 64*p* and 66*s* in coordination with each other from separate developer images. In particular, as shown, each part layer 64*p* may be transferred to belt 22 with proper registration with each support layer 64*s* to preferably produce a combined part and support material layer 64. As discussed below, this allows layers 64*p* and 64*s* to be transfused together, requiring the part and support materials to have thermal properties and melt rheologies that are similar or substantially the same. As can be appreciated, some layers transferred to layer transfusion assembly 20 may only include support material 66s or may only include part material 66p, depending on the particular support structure and 3D part geometries and layer slicing.

In an alternative and less-preferred embodiment, part layers 64p and support layers 64s may optionally be developed and transferred along belt 22 separately, such as with alternating layers 64p and 64s. These successive, alternating layers 64p and 64s may then be transferred to layer transfusion assembly 20, where they may be transfused separately to print the 3D part and support structure.

Figure 3:
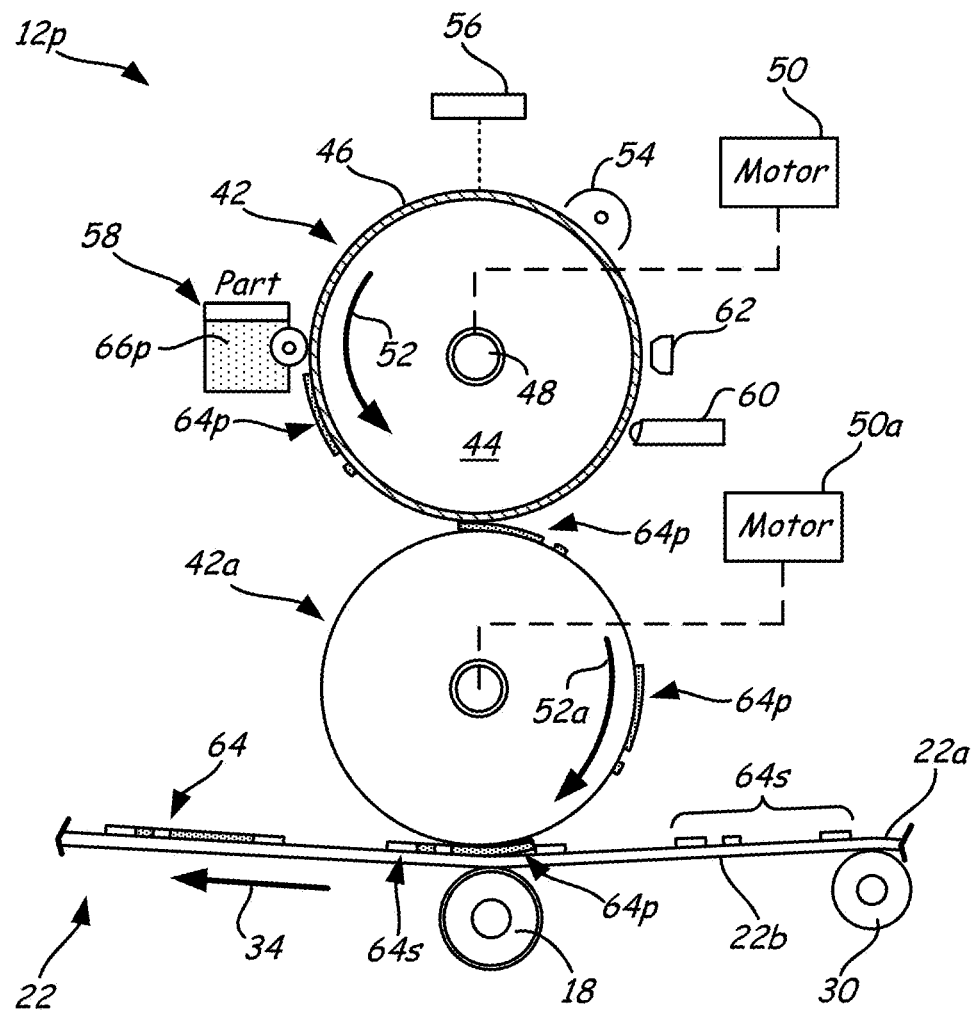
FIG. 3 is a schematic front view of an alternative electrophotography engine, which includes an intermediary drum or belt.

In some preferred embodiments, one or both of EP engines 12p and 12s may also include one or more intermediary transfer drums and/or belts between photoconductor drum 42 and belt 22. For example, as shown in FIG. 3, EP engine 12p may also include intermediary drum 42a that rotates an opposing rotational direction from arrow 52, as illustrated by arrow 52a, under the rotational power of motor 50a. Intermediary drum 42a engages with photoconductor drum 42 to receive the developed layers 64p from photoconductor drum 42, and then carries the received developed layers 64p and transfers them to belt 22.

EP engine 12s may include the same arrangement of intermediary drum 42a for carrying the developed layers 64s from photoconductor drum 42 to belt 22. The use of such intermediary transfer drums or belts for EP engines 12p and 12s can be beneficial for thermally isolating photoconductor drum 42 from belt 22, if desired.

Figure 4:
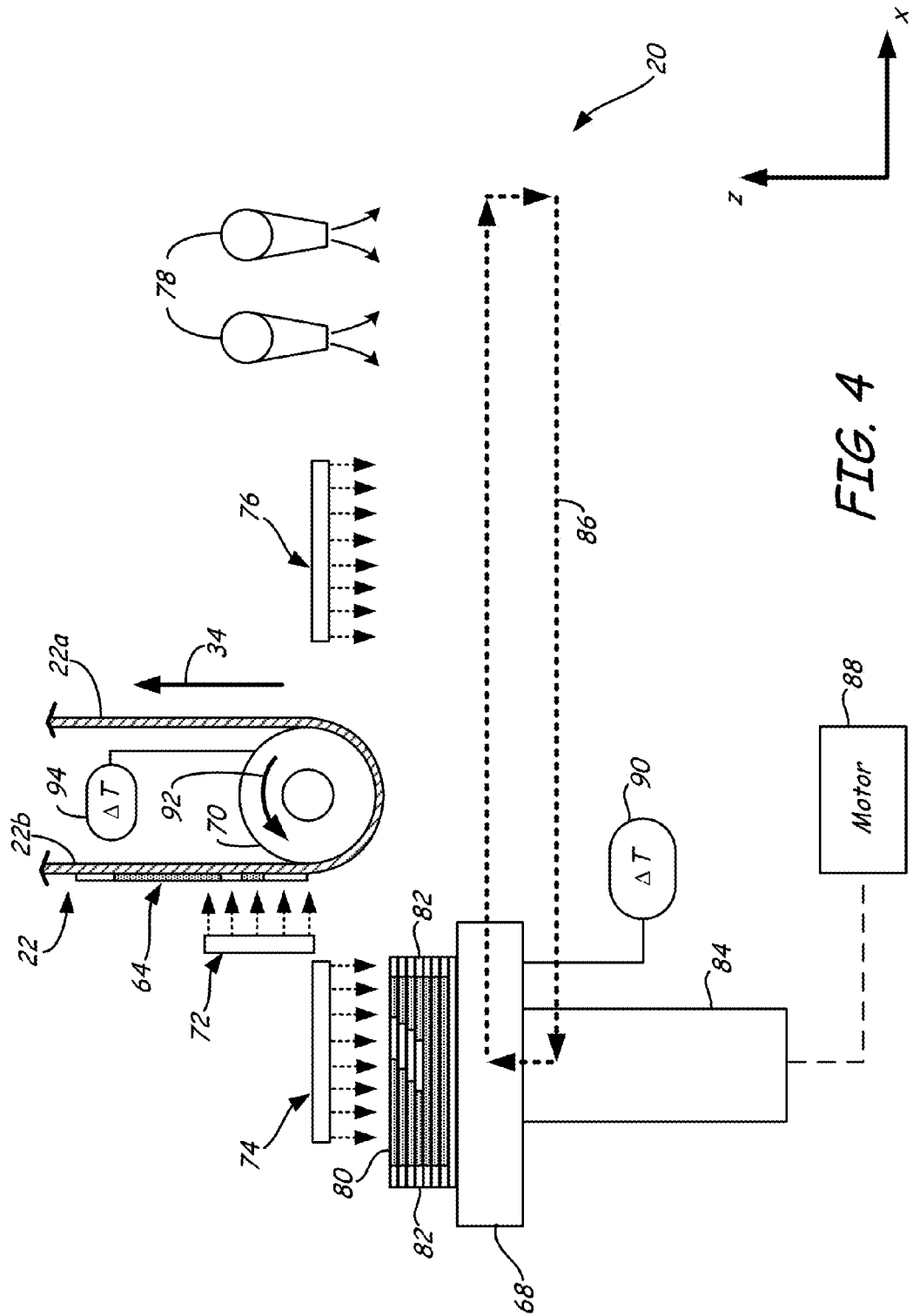
FIG. 4 is a schematic front view of a layer transfusion assembly of the system for performing layer transfusion steps with the developed layers.

FIG. 4 illustrates an example embodiment for layer transfusion assembly 20. As shown, layer transfusion assembly 20 includes build platform 68, nip roller 70, heaters 72 and 74, post-fuse heater 76, and air jets 78 (or other cooling units). Build platform 68 is a platform assembly or platen of system 10 that is configured to receive the heated combined layers 64 (or separate layers 64p and 64s) for printing a 3D part and support structure, referred to as 3D part 80 and support structure 82, in a layer-by-layer manner. In some embodiments, build platform 68 may include removable film substrates (not shown) for receiving the printed layers 64, where the removable film substrates may be restrained against build platform using any suitable technique (e.g., vacuum drawing, removable adhesive, mechanical fastener, and the like).

Build platform 68 is supported by gantry 84, which is a gantry mechanism configured to move build platform 68 along the z-axis and the x-axis to produce a reciprocating rectangular pattern, where the primary motion is back-and-forth along the x-axis (illustrated by broken lines 86. Gantry 84 may be operated by motor 88 based on commands from controller 36, where motor 88 may be an electrical motor, a hydraulic system, a pneumatic system, or the like.

In the shown embodiment, build platform 68 is heatable with heating element 90 (e.g., an electric heater). Heating element 90 is configured to heat and maintain build platform 68 at an elevated temperature that is greater than room temperature (25° C.), such as at a desired average part temperature of 3D part 80 and/or support structure 82, as discussed in Comb et al., U.S. patent application Ser. Nos. 13/790,382 and 13/790,406. This allows build platform 68 to assist in maintaining 3D part 80 and/or support structure 82 at this average part temperature.

Nip roller 70 is an example heatable element or heatable layer transfusion element, which is configured to rotate around a fixed axis with the movement of belt 22. In particular, nip roller 70 may roll against rear surface 22b in the direction of arrow 92 while belt 22 rotates in the direction of arrow 34. In the shown embodiment, nip roller 70 is heatable with heating element 94 (e.g., an electric heater). Heating element 94 is configured to heat and maintain nip roller 70 at an elevated temperature that is greater than room temperature (25° C.), such as at a desired transfer temperature for layers 64.

Heater 72 is one or more heating devices (e.g., an infrared heater and/or a heated air jet) configured to heat layers 64 to a temperature near an intended transfer temperature of the part and support materials, such as at least a fusion temperature of the part and support materials, preferably prior to reaching nip roller 70. Each layer 64 desirably passes by (or through) heater 72 for a sufficient residence time to heat the layer 64 to the intended transfer temperature. Heater 74 may function in the same manner as heater 72, and heats the top surfaces of 3D part 80 and support structure 82 to an elevated temperature, such as at the same transfer temperature as the heated layers 64 (or other suitable elevated temperature).

As mentioned above, the support material 66s used to print support structure 82 preferably has thermal properties (e.g., glass transition temperature) and a melt rheology that are similar to or substantially the same as the thermal properties and the melt rheology of the part material 66p used to print 3D part 80. This allows part and support materials of layers 64p and 64s to be heated together with heater 74 to substantially the same transfer temperature, and also allows the part and support materials at the top surfaces of 3D part 80 and support structure 82 to be heated together with heater 74 to substantially the same temperature. Thus, the part layers 64p and the support layers 64s may be transfused together to the top surfaces of 3D part 80 and support structure 82 in a single transfusion step as combined layer 64. This single transfusion step for transfusing the combined layer 64 is not believed to be feasible without matching the thermal properties and the melt rheologies of the part and support materials.

Post-fuse heater 76 is located downstream from nip roller 70 and upstream from air jets 78, and is configured to heat the transfused layers to an elevated temperature in the post-fuse or heat-setting step. Again, the similar thermal properties and melt rheologies of the part and support materials allow post-fuse heater 76 to post-heat the top surfaces of 3D part 80 and support structure 82 together in a single post-fuse step.

Prior to printing 3D part 80 and support structure 82, build platform 68 and nip roller 70 may be heated to their desired temperatures. For example, build platform 68 may be heated to the average part temperature of 3D part 80 and support structure 82 (due to the close melt rheologies of the part and support materials). In comparison, nip roller 70 may be heated to a desired transfer temperature for layers 64 (also due to the similar thermal properties and melt rheologies of the part and support materials).

During the printing operation, belt 22 carries a layer 64 past heater 72, which may heat the layer 64 and the associated region of belt 22 to the transfer temperature. Suitable transfer temperatures for the part and support materials include temperatures that exceed the glass transition temperatures of the part and support materials, which are preferably similar or substantially the same, and where the part and support materials of layer 64 are softened but not melted (e.g., a temperature of ranging from about 140° C. to about 180° C. for an ABS part material).

As further shown in FIG. 4, during operation, gantry 84 may move build platform 68 (with 3D part 80 and support structure 82) in a reciprocating rectangular pattern 86. In particular, gantry 84 may move build platform 68 along the x-axis below, along, or through heater 74. Heater 74 heats the top surfaces of 3D part 80 and support structure 82 to an elevated temperature, such as the transfer temperatures of the part and support materials. As discussed in Comb et al., U.S. patent application Ser. Nos. 13/790,382 and 13/790,406, heaters 72 and 74 may heat layers 64 and the top surfaces of 3D part 80 and support structure 82 to about the same temperatures to provide a consistent transfusion interface temperature. Alternatively, heaters 72 and 74 may heat layers 64 and the top surfaces of 3D part 80 and support structure 82 to different temperatures to attain a desired transfusion interface temperature.

The continued rotation of belt 22 and the movement of build platform 68 align the heated layer 64 with the heated top surfaces of 3D part 80 and support structure 82 with proper registration along the x-axis. Gantry 84 may continue to move build platform 68 along the x-axis, at a rate that is synchronized with the rotational rate of belt 22 in the direction of arrow 34 (i.e., the same directions and speed). This causes rear surface 22b of belt 22 to rotate around nip roller 70 to nip belt 22 and the heated layer 64 against the top surfaces of 3D part 80 and support structure 82. This presses the heated layer 64 between the heated top surfaces of 3D part 80 and support structure 82 at the location of nip roller 70, which at least partially transfuses heated layer 64 to the top layers of 3D part 80 and support structure 82.

As the transfused layer 64 passes the nip of nip roller 70, belt 22 wraps around nip roller 70 to separate and disengage from build platform 68. This assists in releasing the transfused layer 64 from belt 22, allowing the transfused layer 64 to remain adhered to 3D part 80 and support structure 82. Maintaining the transfusion interface temperature at a transfer temperature that is higher than the glass transition temperatures of the part and support materials, but lower than their fusion temperatures, allows the heated layer 64 to be hot enough to adhere to 3D part 80 and support structure 82, while also being cool enough to readily release from belt 22. Additionally, as discussed above, the similar thermal properties and melt rheologies of the part and support materials allow them to be transfused in the same step.

After release, gantry 84 continues to move build platform 68 along the x-axis to post-fuse heater 76. At post-fuse heater 76, the top-most layers of 3D part 80 and support structure 82 (including the transfused layer 64) may then be heated to at least the fusion temperature of the part and support materials in a post-fuse or heat-setting step. This melts the part and support materials of the transfused layer 64 to a highly fusible state such that polymer molecules of the transfused layer 64 quickly inter-diffuse to achieve a high level of interfacial entanglement with 3D part 80 and support structure 82.

Additionally, as gantry 84 continues to move build platform 68 along the x-axis past post-fuse heater 76 to air jets 78, air jets 78 blow cooling air towards the top layers of 3D part 80 and support structure 82. This actively cools the transfused layer 64 down to the average part temperature, as discussed in Comb et al., U.S. patent application Ser. Nos. 13/790,382 and 13/790,406.

To assist in keeping 3D part 80 and support structure 82 at the average part temperature, in some preferred embodiments, heater 74 and/or post-heater 76 may operate to heat only the top-most layers of 3D part 80 and support structure 82. For example, in embodiments in which heaters 72, 74, and 76 are configured to emit infrared radiation, 3D part 80 and support structure 82 may include heat absorbers and/or other colorants configured to restrict penetration of the infrared wavelengths to within the top-most layers. Alternatively, heaters 72, 74, and 76 may be configured to blow heated air across the top surfaces of 3D part 80 and support structure 82.

In either case, limiting the thermal penetration into 3D part 80 and support structure 82 allows the top-most layers to be sufficiently transfused, while also reducing the amount of cooling required to keep 3D part 80 and support structure 82 at the average part temperature.

Gantry 84 may then actuate build platform 68 downward, and move build platform 68 back along the x-axis to a starting position along the x-axis, following the reciprocating rectangular pattern 86. Build platform 68 desirably reaches the starting position for proper registration with the next layer 64. In some embodiments, gantry 84 may also actuate build platform 68 and 3D part 80/support structure 82 upward for proper registration with the next layer 64. The same process may then be repeated for each remaining layer 64 of 3D part 80 and support structure 82.

In some preferred embodiments, a resulting 3D part 80 is encased laterally (i.e., horizontally to the build plane) in the support structure 82, such as shown in FIG. 4. This is believed to provide good dimensional integrity and surface quality for the 3D part 80 while using a reciprocating build platen 68 and a nip roller 70.

After the printing operation is completed, the resulting 3D part 80 and support structure 82 may be removed from system 10 and undergo one or more post-printing operations. For example, support structure 82 derived from the support material of the present disclosure may be sacrificially removed from 3D part 80, such as by using an aqueous-based solution (e.g., an aqueous alkali solution). Under this preferred soluble technique, support structure 82 may at least partially dissolve in the solution, separating it from 3D part 80 in a hands-free manner.

In comparison, part materials such as an ABS part material are chemically resistant to aqueous alkali solutions. This allows the use of an aqueous alkali solution to be employed for removing the sacrificial support structure 82 without degrading the shape or quality of 3D part 80. Examples of suitable systems and techniques for removing support structure 82 in this manner include those disclosed in Swanson et al., U.S. Pat. No. 8,459,280; Hopkins et al., U.S. Pat. No. 8,246,888; and Dunn et al., U.S. Publication No. 2011/0186081; each of which are incorporated by reference to the extent that they do not conflict with the present disclosure.

Furthermore, after support structure 82 is removed, 3D part 80 may undergo one or more additional post-printing processes, such as surface treatment processes. Examples of suitable surface treatment processes include those disclosed in Priedeman et al., U.S. Pat. No. 8,123,999; and in Zinniel, U.S. Publication No. 2008/0169585.

As briefly discussed above, the support material of the present disclosure includes a thermoplastic copolymer, a charge control agent, and optionally a heat absorber (e.g., an infrared absorber) and/or one or more additional materials, such as a flow control agent. The support material has also been developed to balance competing factors for use in an electrophotography-based additive manufacturing system (e.g., system 10), and to be soluble in an aqueous solution (e.g., an alkaline aqueous solution) for removal from the 3D part.

The thermoplastic copolymer of the support material is polymerized from monomers that preferably include one or more ethylenically-unsaturated aromatic monomers (e.g., styrene), one or more alkyl(meth)acrylate monomers, and one or more (meth)acrylic acid monomers, where carboxylic acid groups from the one or more (meth)acrylic acid monomers are preferably converted to anhydride groups to the fullest extent possible.

Example ethylenically-unsaturated aromatic monomers have the following structure:

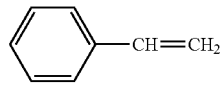

(Formula 1)

where, in some embodiments, the hydrogen atoms in Formula 1 may be independently substituted with one or more optional low-atomic weight groups, such as an alkyl or ether group having 1-3 carbon atoms. Furthermore, in some embodiments, the ethylenically-unsaturated group and the aromatic group may be separated by an optional chain linkage, such as a hydrocarbon or ether linkage having 1-8 carbon atoms.

In some further embodiments, one or more hydrogen atoms of the aromatic group may be independently substituted with one or more optional low-atomic weight groups, such as an alkyl or ether group having 1-3 carbon atoms. More preferably, the aromatic monomer includes the structure shown above in Formula 1, with the ethylenically-unsaturated vinyl group extending directly from the aromatic group (i.e., styrene). The aromatic monomers raise the glass transition temperature of the resulting copolymer and provide polymer hardness.

Example alkyl(meth)acrylate monomers have the following structure:

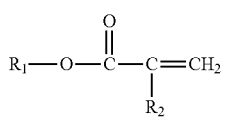

(Formula 2)

where $R_1$ is a hydrocarbon chain having 1-8 carbon atoms (more preferably 2-5 carbon atoms). $R_2$ is a hydrogen atom, or an alkyl or ether group having 1-3 carbon atoms (more preferably a hydrogen atom). Furthermore, in some embodiments, the ethylenically-unsaturated group and the carbonyl group may be separated by an optional chain linkage, such as a hydrocarbon or ether linkage having 1-8 carbon atoms.

More preferably, the alkyl(meth)acrylate monomer includes the structure shown above in Formula 2, with the ethylenically-unsaturated vinyl group extending directly from the carbonyl group, and most preferably where $R_1$ is a hydrocarbon chain having 2-5 carbon atoms, and $R_2$ is a hydrogen atom (e.g., an alkyl acrylate, such as butyl acrylate). The alkyl(meth)acrylate monomers tend to lower the glass transition temperature of the resulting copolymer, but provide polymer softness and elasticity.

Example (meth)acrylic acid monomers have the following structure:

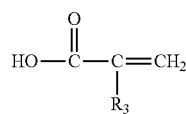

(Formula 3)

where $R_3$ is a hydrogen atom, or an alkyl or ether group having 1-3 carbon atoms (more preferably an alkyl group, such as a methyl group). Furthermore, in some embodiments, the ethylenically-unsaturated group and the carboxylic acid group may be separated by an optional chain linkage, such as a hydrocarbon or ether linkage having 1-8 carbon atoms. In its simplest form, the term "carboxlyic acid group" refers to a —C(O)OH carboxyl group.

More preferably, the (meth)acrylic acid monomer includes the structure shown above in Formula 3, with the ethylenically-unsaturated vinyl group extending directly from the carboxylic acid group, and most preferably where $R_3$ is a methyl group (i.e., methacrylic acid). The (meth)acrylic acid monomers also raise the glass transition temperature of the resulting copolymer, and impart aqueous solubility to the resulting copolymer.

The polymerization of the thermoplastic copolymer may be performed with a free-radical polymerization reaction of the monomers, using any suitable polymerization initiator, such as dibenzoyl peroxide. The polymerization is preferably performed in solution, so as to ensure the formation of a random, completely amorphous, copolymer. For example, the polymerization reaction may be performed by charging the monomer components, along with a suitable carrier solvent (e.g., ethanol) to a reaction vessel. The reaction vessel is preferably purged with an inert gas (e.g., nitrogen) and heated to a reaction temperature (e.g., from about 80° C. to about 85° C.). The polymerization initiator may then be introduced to the reaction vessel, preferably in separate sub-doses to prevent the exothermic polymerization reaction from raising the reaction temperature to the point where excessive solvent boiling would occur.

For example, the polymerization initiator may be added in three separate steps, allowing the polymerization reaction to proceed for a suitable duration (e.g., two hours) between each addition. In this embodiment, the first addition of the polymerization initiator preferably ranges from about 50% to about 70% by weight of a total weight of the polymerization initiator added. Correspondingly, the second addition of the polymerization initiator preferably ranges from about 20% to about 30% by weight of the total weight of the polymerization initiator added, and the third addition of the polymerization initiator preferably ranges from about 5% to about 25% by weight of a total weight of the polymerization initiator added.

It has been found that adjusting the total amount of the polymerization initiator added, and the relative amounts in the separate additions, can control the molecular weight of the resulting thermoplastic copolymer. Accordingly, in a preferred embodiment in which the support material is intended to complement an ABS part material, the first addition of the polymerization initiator ranges from about 63% to about 67% by weight, the second addition of the polymerization initiator ranges from about 23% to about 27% by weight, and the third addition of the polymerization initiator ranges from about 9% to about 13% by weight, relative to the total weight of the polymerization initiator added. This preferred embodiment for the polymerization initiator is even more preferably combined with the monomers of styrene, butyl acrylate, and methacrylic acid.

After the polymerization is completed, the resulting viscous copolymer solution may be diluted with a solvent (e.g., ethanol) and allowed to cool to room temperature. Next, the copolymer solution may be precipitated into a non-solvent (e.g., cyclohexane) under vigorous stirring, and the solvent may be separated from resulting thermoplastic copolymer. The thermoplastic copolymer may then be dried under vacuum at an elevated temperature (e.g., 100° C.) for a suitable duration, and then recovered.

This polymerization reaction produces the thermoplastic copolymer with the monomer units having desired molar ratios of the monomers, and, preferably, a controlled molecular weight. The ethylenically-unsaturated aromatic monomers used to produce the thermoplastic copolymer may constitute from about 25% to about 50% by weight, more preferably from about 30% to about 40% by weight, and even more preferably from about 32% to about 36% by weight, based on an entire weight of monomers used to produce the thermoplastic copolymer.

The alkyl(meth)acrylate monomers used to produce the thermoplastic copolymer may constitute from about 15% to about 35% by weight, more preferably from about 20% to about 30% by weight, and even more preferably from about 22% to about 28% by weight, based on an entire weight of monomers used to produce the thermoplastic copolymer. The (meth)acrylic acid monomers used to produce the thermoplastic copolymer may constitute from about 30% to about 50% by weight, more preferably from about 35% to about 45% by weight, and even more preferably from about 38% to about 43% by weight, based on an entire weight of monomers used to produce the thermoplastic copolymer.

In some embodiments, the monomers used to polymerize the thermoplastic copolymer may include one or more additional monomer compounds that preferably do not significantly detract from the strength, chemical, or thermal properties of the thermoplastic copolymer. For example, the thermoplastic copolymer may include monomers that function as chain extending units (e.g., ethylene units) for the copolymer backbone.

Accordingly, the additional monomers may collectively constitute from 0% by weight to about 10% by weight, based on the entire weight of the monomers used to produce the thermoplastic copolymer. In some embodiment, the additional monomers may constitute from about 0.1% to about 5% by weight, based on the entire weight of the monomers used to produce the thermoplastic copolymer. The remainder of the monomers used to polymerize the thermoplastic copolymer accordingly consist of the above-discussed ethylenically-unsaturated aromatic monomers, the alkyl(meth)acrylate monomers, and the (meth)acrylic acid monomers.

In other preferred embodiments, the monomers used to polymerize the thermoplastic copolymer consist essentially or completely of the ethylenically-unsaturated aromatic monomers, the alkyl(meth)acrylate monomers, and the (meth)acrylic acid monomers. In more preferred embodiments, the monomers used to polymerize the soluble copolymer consist essentially or completely of styrene, butyl acrylate, and methacrylic acid.

The polymerized thermoplastic copolymer, as synthesized by free-radical polymerization reaction from the above-discussed monomers, results in a high yield of the resulting copolymer in very high conversion of the monomers-to-copolymer. Furthermore, the carboxylic acid groups from the (meth)acrylic acid monomers typically remain unaffected, and extend as pendant groups from the copolymer backbone. As such, the thermoplastic copolymer at this stage may be referred to as being in the "acid form".

However, this acid form of the thermoplastic copolymer is not thermally stable. When heated above about 180° C., the pendant carboxylic acid groups readily convert intra-molecularly into anhydride groups, where the degree to which this anhydride conversion occurs is dependent on the monomer unit arrangement along the thermoplastic copolymer, as well as the temperature to which it is heated.

As can be appreciated, during a layer transfusion step in an electrophotography-based additive manufacturing system, the support material can be quickly heated above this temperature. As such, if the thermoplastic copolymer in the support material retains a significant number of carboxylic acid groups capable of converting to anhydride groups, the layer transfusion step can undesirably initiate the anhydride conversion while printing layers of the support structure (e.g., support structure 82). Unfortunately, anhydride conversion also results in the concomitant evolution of water molecules in the form of vapor. This can result in foaming and bubbling of the heated support material during the transfusion step, potentially leading to distortion of the support layer and a failure of the overall contiguous 3D printing process.

As such, to avoid this issue, the thermoplastic copolymer in acid form is preferably heated to maximize (or substantially maximize) the conversion of the carboxylic acid groups into anhydride groups, thereby providing the thermoplastic copolymer in "anhydride form". Suitable temperatures for heating the thermoplastic copolymer range from about 160° C. to about 230° C., and more preferably from about 180° C. to about 230° C. The heating duration may vary depending on the temperature, such as greater than 30 minutes for a temperature of about 230° C.

The thermoplastic copolymer is typically not capable of converting 100% of the carboxylic acid groups into anhydride groups upon heating, nor is this necessary to prevent the foaming and bubbling during a layer transfusion step. Rather, only those carboxylic acid groups in monomer units that are adjacent to each other along the backbone of the copolymer chain are capable of intra-molecular conversion into an anhydride ring structure. In comparison, a carboxylic acid group in a monomer unit that is not adjacent to another monomer unit containing a carboxylic acid group along the backbone of the copolymer chain (i.e., located between ethylenically-unsaturated aromatic and/or alkyl(meth)acrylate monomer units) is sterically shielded by the adjacent aromatic and/or (meth)acrylate-based ester groups, and typically cannot form anhydride structures intra-molecularly.

For instance, the ethylenically-unsaturated aromatic monomers, the alkyl(meth)acrylate monomers, and the (meth)acrylic acid monomers may be polymerized to produce a thermoplastic copolymer in "acid form" having the following structure:

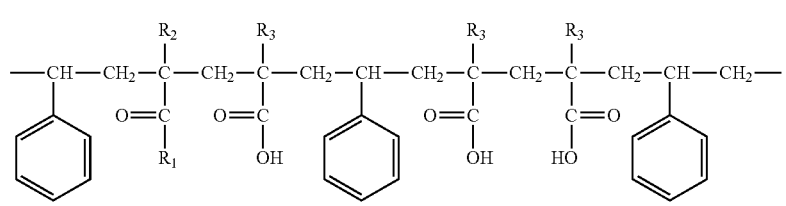

(Formula 4)

Upon undergoing the above-discussed heating step to convert carboxylic acid groups to anhydride groups, the copolymer illustrated in Formula 4 will react to produce a thermoplastic copolymer in "anhydride form", with concomitant evolution of water, having the following structure:

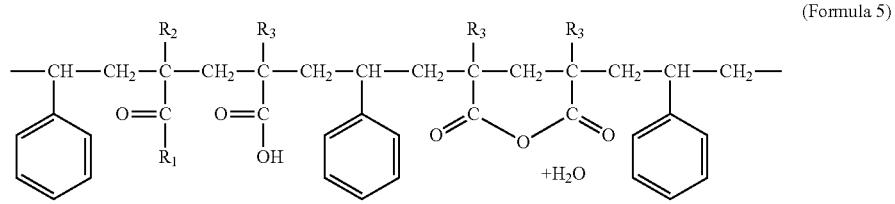

(Formula 5)

This can be further illustrated by an example in which the ethylenically-unsaturated aromatic monomer is styrene, the alkyl(meth)acrylate monomer is butyl acrylate, and the (meth)acrylic acid monomer is methacrylic acid. In this example, the thermoplastic copolymers of Formulas 4 and 5 respectively have the following structures:

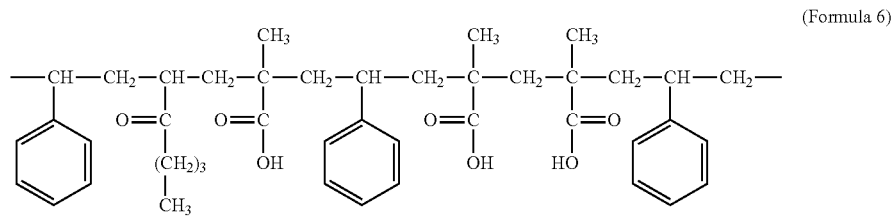

(Formula 6)

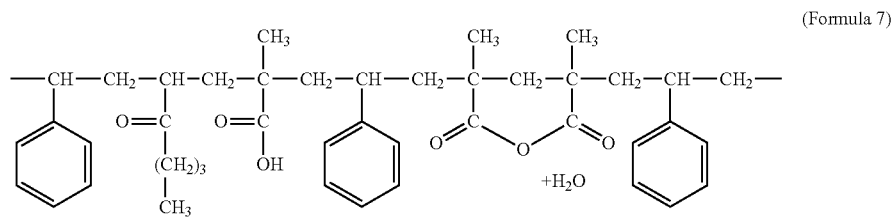

(Formula 7)

As illustrated by the thermoplastic copolymers in each of Formulas 5 and 7, only the carboxylic acid groups in monomer units that are adjacent to each other undergo the conversion to produce the 6-membered anhydride ring structure. In comparison, the isolated carboxylic acid group in each of Formulas 5 and 7, which is located between the (meth)acrylate-based ester group and the aromatic group, remains unreacted.

The extent of anhydride conversion may vary depending on the particular monomer ratios used, and more particularly, on the concentration of the (meth)acrylic acid monomer(s) relative to the total monomer concentration. With respect to the above-discussed embodiments, the maximum amount of carboxylic acid groups that are converted to anhydride groups typically ranges from about 60% to about 65%, relative to the initial number of carboxylic acid groups in the copolymer prior to the anhydride conversion. In comparison, soluble thermoplastic copolymers used in support materials for extrusion-based additive manufacturing techniques typically have substantially lower maximum anhydride conversions, such as from about 40% to about 45%.

The term "maximum anhydride conversion" refers to a conversion in which all carboxylic acid groups in the thermoplastic copolymer that are capable of forming intra-molecular anhydride groups are actually converted to the anhydride groups. As such, in some embodiments, the thermoplastic copolymer for the support material of the present disclosure has an anhydride conversion that is greater than 90%, more preferably greater than 95%, even more preferably greater than 99%, and most preferably 100% of the maximum anhydride conversion. For example, a conversion that is 95% of the maximum anhydride conversion, where the maximum anhydride conversion is 65% relative to the initial number of carboxylic acid groups, means that about 62% of the initial number of carboxylic acid groups are converted to anhydride groups.

Anhydride conversion is typically accompanied by a significant reduction in the glass transition temperature of the thermoplastic copolymer when compared to the thermoplastic copolymer in acid form prior to the anhydride conversion. For example, for the above-discussed monomers, the thermoplastic copolymer in acid form may have a glass transition temperature ranging from about 140° C. to about 150° C., and more typically from about 143° C. to about 148° C. In comparison, after the anhydride conversion, the same thermoplastic copolymer in anhydride form may have a glass transition temperature ranging from about 100° C. to about 115° C., more typically from about 105° C. to about 110° C.

This can also be seen by a reduction in the molecular weight of the copolymer, as determined by the Molecular Weight test described below. For example, for the above-discussed monomers, the thermoplastic copolymer in acid form may have a weight-average molecular weight (Mw) ranging from about 60,000 to about 120,000, more preferably from about 65,000 to about 90,000, and even more preferably from about 70,000 to about 75,000. In terms of number-average molecular weights (Mn), for the above-discussed monomers, the thermoplastic copolymer in acid form may have a number-average molecular weight ranging from about 28,000 to about 60,000, more preferably from about 30,000 to about 40,000, and even more preferably from about 31,000 to about 36,000. Suitable ratios of Mw/Mn range from about 2.00 to about 2.20.

In comparison, after the anhydride conversion, the same thermoplastic copolymer in anhydride form may have a weight-average molecular weight (Mw) that is about 3,000 to 4,000 less. This corresponds to a significant reduction to the thermal properties and melt viscosity of the thermoplastic copolymer when compared to the same thermoplastic copolymer in acid form prior to the anhydride conversion. As discussed above, the support material used to print support structure 82 preferably has thermal properties (e.g., glass transition temperature) and a melt rheology that is similar to or substantially the same as those of the part material used to print 3D part 80. This allows part and support materials of layers 64p and 64s to be heated simultaneously with heater 74 to substantially the same transfer temperature, and also allows the part and support materials at the top surfaces of 3D part 80 and support structure 82 to be heated together with heater 74 to substantially the same temperature. Thus, the part layers 64p and the support layers 64s may be transfused together to the top surfaces of 3D part 80 and support structure 82 in a single transfusion step as combined layer 64.

As such, when engineering the support material of the present disclosure for compatibility with a desired part material (e.g., an ABS part material), this reduction in the thermal properties and melt rheology of the thermoplastic copolymer due to the anhydride conversion is accounted for during the polymerization process to produce the thermoplastic copolymer. In particular, as discussed further below, it has been found that the thermoplastic copolymer may be polymerized with molecular weight modifications to attain a desired glass transition temperature and melt rheology profile that is similar to or substantially the same as those of a desired part material, such the above-discussed ABS part material.

Preferably, the thermoplastic copolymer of the support material (and the support material itself) have glass transition temperatures within about 10° C. of the glass transition temperature of the part material, and more preferably within about 5° C., where the glass transition temperatures are determined pursuant to the Glass Transition Temperature test described below. Furthermore, the thermoplastic copolymer (and the support material itself) preferably has dynamic viscosities at 180° C., at 190° C., and at 200° C. that are each within about 10 kilopascal-seconds of the respective dynamic viscosities for the part material, more preferably within about 5 kilopascal-seconds, and even more preferably within about 2 kilopascal-seconds, where the dynamic viscosities are determined pursuant to the Melt Rheology test described below.

For instance, when used to complement an ABS part material, such as the ABS part material disclosed in co-filed U.S. patent application Ser. No. 13/944,472, entitled "ABS Part Material For Electrophotography-Based Additive Manufacturing", preferred glass transition temperatures for the thermoplastic copolymer (and the support material itself) range from about 100° C. to about 115° C., more preferably from about 105° C. to about 110° C. In some embodiments, the glass transition temperatures for the support material copolymer may range from about 106° C. to about 108° C. Suitable dynamic viscosities for the thermoplastic copolymer (and the support material itself) at 180° C. range from about 17 kilopascal-seconds to about 24 kilopascal-seconds, at 190° C. range from about 6 kilopascal-seconds to about 10 kilopascal-seconds, and at 200° C. range from about 3.5 kilopascal-seconds to about 4.5 kilopascal-seconds.

In order to increase the commercial-viability of the manufacturing process, the thermoplastic copolymer is preferably isolated from polymerization solvent (e.g., ethanol). For example, after the polymerization process is completed, the copolymer solution may be heated to about 200° C. to about 230° C., under partial vacuum, in order to evaporate and ensure complete removal of the solvent together with any trace amounts of residual monomers. This also provides a copolymer melt which can be extruded and pelletized for further necessary particle size reduction techniques required to produce the copolymer powder.

Furthermore, the solvent is preferably recycled to reduce material costs for producing the support material of the present disclosure. For example, after a polymerization process is completed, the solvent (e.g., ethanol) may be distilled and recovered for use in subsequent polymerization processes.

Furthermore, in some preferred embodiments, the solvent isolation and the above-discussed anhydride conversion may be performed in the same step. For example, the copolymer solution may be heated in multiple stages with increasing temperatures. The initial stage(s) (e.g., at about 200° C. to about 220° C.) may be used to evaporate and remove the solvent, and the later stage(s) (e.g., at about 230° C.) may be used for the anhydride conversion. This process may also be combined with extruding the thermoplastic copolymer in strand form for subsequent pelletizing, grinding, micronization, and/or classification, such as with a polymer isolation device commercially available under the tradename "ENTEX" Planetary Roller Extruder device from ENTEX Rust & Mitschke GmBH, Bochum, Germany.

As mentioned above, the support material is engineered for use in an EP-based additive manufacturing system (e.g., system 10) to print support structures (e.g., support structure 82). As such, the support material may also include one or more materials to assist in developing layers with EP engine 12s, to assist in transferring the developed layers from EP engine 12s to layer transfusion assembly 20, and to assist in transfusing the developed layers with layer transfusion assembly 20.

For example, in the electrophotographic process with system 10, the support material is preferably charged triboelectrically through the mechanism of frictional contact charging with carrier particles at development station 58. This charging of the support material may be referred to by its triboelectric charge-to-mass (Q/M) ratio, which may be a positive or negative charge and has a desired magnitude. The Q/M ratio is inversely proportional to the powder density of the support material, which can be referred to by its mass per unit area (M/A) value. For a given applied development field, as the value of Q/M ratio of the support material is increased from a given value, the M/A value of the support material decreases, and vice versa. Thus, the powder density for each developed layer of the part material is a function of the Q/M ratio of the support material.

It has been found that, in order to provide successful and reliable development of the support material onto development drum 44 and transfer to layer transfusion assembly 20 (e.g., via belt 22), and to print support structure 82 with a good material density, the support material preferably has a suitable Q/M ratio for the particular architecture of EP engine 12s and belt 22. Furthermore, because the part and support materials are preferably transferred together to layer transfusion assembly 20 by belt 22 (e.g., as combined layer 64), the part and support materials preferably have similar or substantially the same Q/M ratios.

Accordingly, the support material preferably has a Q/M ratio that is the same sign (i.e., negative or positive) as the Q/M ratio of the part material, and is also preferably within about 10 micro-Coulombs/gram (µC/g) of the Q/M ratio of the part material, more preferably within about 5 µC/g, and even more preferably within about 3 µC/g, where the Q/M ratios are determined pursuant to the Triboelectric Charging test described below. Examples of preferred Q/M ratios for the support material range from about −5 micro-Coulombs/gram (µC/g) to about −50 µC/g, more preferably from about −10 µC/g to about −40 µC/g, and even more preferably from about −15 µC/g to about −35 µC/g, and even more preferably from about −25 µC/g to about −30 µC/g.

In this above-discussed embodiment, the Q/M ratio is based on a negative triboelectric charge. However, in an alternative embodiment, system 10 may operate such that the Q/M ratio of the support material has a positive triboelectric charge with the above-discussed magnitudes. In either embodiment, these magnitudes of Q/M ratio prevent the electrostatic forces constraining the support material to the carrier surfaces from being too excessive, and that any level of "wrong sign" powder is minimized. This reduces inefficiencies in the development of the support material at EP engine 12s, and facilitates the development and transfer of each layer 64s with the desired M/A value.

Furthermore, if a consistent material density of support structure 82 is desired, the desired Q/M ratio (and corresponding M/A value) is preferably maintained at a stable level during an entire printing operation with system 10. However, over extended printing operations with system 10, development station 58 of EP engine 12s may need to be replenished with additional amounts of the support material. This can present an issue because, when introducing additional amounts of the support material to development station 58 for replenishment purposes, the support material is initially in an uncharged state until mixing with the carrier particles. As such, the support material also preferably charges to the desired Q/M ratio at a rapid rate to maintain a continuous printing operation with system 10.

Accordingly, controlling and maintaining the Q/M ratio during initiation of the printing operation, and throughout the duration of the printing operation, will control the resultant rate and consistency of the M/A value of the support material. In order to reproducibly and stably achieve the desired Q/M ratio, and hence the desired M/A value, over extended printing operations, the support material preferably includes one or more charge control agents, which may be added to the thermoplastic copolymer during the manufacturing process of the support material. For example, the charge control agent may be melt blended with the thermoplastic copolymer, prior to subjecting the blended materials to grinding, micronization, and/or classification.

In embodiments in which the Q/M ratio of the support material has a negative charge, suitable charge control agents for use in the support material include acid metal complexes (e.g., oxy carboxylic acid complexes of chromium, zinc, and aluminum), azo metal complexes (e.g., chromium azo complexes and iron azo complexes), mixtures thereof, and the like.

Alternatively, in embodiments in which the Q/M ratio of the support material has a positive charge, suitable charge control agents for use in the support material include azine-based compounds, and quaternary ammonium salts, mixtures thereof, and the like. These agents are effective at positively charging the thermoplastic copolymer when frictionally contact charged against appropriate carrier particles.

The charge control agents preferably constitute from about 0.1% by weight to about 5% by weight of the support material, more preferably from about 0.5% by weight to about 2% by weight, and even more preferably from about 0.75% by weight to about 1.5% by weight, based on the entire weight of the support material. As discussed above, these charge control agents preferably increase the charging rate of the thermoplastic copolymer of the support material against the carrier, and stabilize the Q/M ratio over extended continuous periods of printing operations with system 10.

In many situations, system 10 prints layers 64s with a substantially consistent material density over the duration of the printing operations. Having a support material with a controlled and consistent Q/M ratio allows this to be achieved. However, in some situations, it may be desirable to adjust the material density between the various layers 64s in the same printing operation. For example, system 10 may be operated to run in a grayscale manner with reduced material density, if desired, for one or more portions of support structure 82.

In addition to incorporating the charge control agents, for efficient operation EP engine 12s, and to ensure fast and efficient triboelectric charging during replenishment of the support material, the mixture of the support material preferably exhibits good powder flow properties. This is preferred because the support material is fed into a development sump (e.g., a hopper) of development station 58 by auger, gravity, or other similar mechanism, where the support material undergoes mixing and frictional contact charging with the carrier particles.

As can be appreciated, blockage or flow restrictions of the support material during the replenishment feeding can inhibit the supply of the support material to the carrier particles. Similarly, portions of the support material should not become stuck in hidden cavities in development station 58. Each of these situations can alter the ratio of the support material to the carrier particles, which, as discussed above, is preferably maintained at a constant level to provide the desired Q/M ratio for the charged support material.

For example, the support material may constitute from about 1% by weight to about 30% by weight, based on a combined weight of the support material and the carrier particles, more preferably from about 5% to about 20%, and even more preferably from about 5% to about 10%. The carrier particles accordingly constitute the remainder of the combined weight.

The powder flow properties of the support material can be improved or otherwise modified with the use of one or more flow control agents, such as inorganic oxides. Examples of suitable inorganic oxides include hydrophobic fumed inorganic oxides, such as fumed silica, fumed titania, fumed alumina, mixtures thereof, and the like, where the fumed oxides may be rendered hydrophobic by silane and/or siloxane-treatment processes. Examples of commercially available inorganic oxides for use in the support material include those under the tradename "AEROSIL" from Evonik Industries AG, Essen, Germany.

The flow control agents (e.g., inorganic oxides) preferably constitute from about 0.1% by weight to about 10% by weight of the support material, more preferably from about 0.2% by weight to about 5% by weight, and even more preferably from about 0.3% by weight to about 1.5% by weight, based on the entire weight of the support material. The flow control agents may be introduced to the thermoplastic copolymer and charge control agent at any suitable point in the manufacturing process to produce the support material. For example, the blended thermoplastic copolymer may be further dry blended in a high speed and high shear cyclonic mixing apparatus, preferably at 25° C., with one or more external flow control agents. This uniformly distributes, coats, and partially embeds the flow control agent(s) into the individual particles of the blended thermoplastic copolymer, without significantly altering the particle size or particle size distribution.

As discussed above, the one or more charge control agents are suitable for charging the support material copolymer to a desired Q/M ratio for developing layers of the support material at EP engine 12s, and for transferring the developed layers (e.g., layers 64) to layer transfusion assembly 20 (e.g., via belt 22). However, the multiple printed layers in a 3D environment effectively prevents the electrostatic transfer of support material after a given number of layers are printed. Instead, layer transfusion assembly 20 utilizes heat and pressure to transfuse the developed layers together in the transfusion steps.

In particular, heaters 72 and/or 74 may heat layers 64 and the top surfaces of 3D part 80 and support structure 82 to a temperature near an intended transfer temperature of the part and support material, such as at least a fusion temperature of the part and support material, prior to reaching nip roller 70. Similarly, post-fuse heater 76 is located downstream from nip roller 70 and upstream from air jets 78, and is configured to heat the transfused layers to an elevated temperature in the post-fuse or heat-setting step.

Accordingly, the support material may also include one or more heat absorbers configured to increase the rate at which the support material is heated when exposed to heater 72, heater 74, and/or post-heater 76. For example, in embodiments in which heaters 72, 74, and 76 are infrared heaters, the heat absorber(s) used in the support material may be one or more infrared (including near-infrared) wavelength absorbing materials. Absorption of infrared light causes radiationless decay of energy to occur within the particles, which generates heat in the support material.

Suitable infrared absorbing materials for use in the support material may vary depending on the desired color of the support material. Examples of suitable infrared absorbing materials include carbon black (which may also function as a black pigment for the support material), as well as various classes of infrared absorbing pigments and dyes, such as those that exhibit absorption in the wavelengths ranging from about 650 nanometers (nm) to about 900 nm, those that exhibit absorption in the wavelengths ranging from about 700 nm to about 1,050 nm, and those that exhibit absorption in the wavelengths ranging from about 800 nm to about 1,200 nm. Examples of these pigments and dyes classes include anthraquinone dyes, polycyanine dyes metal dithiolene dyes and pigments, tris aminium dyes, tetrakis aminium dyes, mixtures thereof, and the like.

The infrared absorbing materials also preferably do not significantly reinforce or otherwise alter the melt rheologies of the thermoplastic copolymer of the support material, such as the zero shear viscosity versus temperature profile of the thermoplastic copolymer. For example, this can be achieved using a non-reinforcing type of carbon black, or a "low structure" type of carbon black, at low concentrations relative to the thermoplastic copolymer. Accordingly, suitable dynamic viscosities for the support material include those discussed above for the thermoplastic copolymer at 180° C., 190° C., and 200° C.

In embodiments that incorporate heat absorbers, the heat absorbers (e.g., infrared absorbers) preferably constitute from about 0.5% by weight to about 10% by weight of the support material, more preferably from about 1% by weight to about 5% by weight, and in some more preferred embodiments, from about 2% by weight to about 3% by weight, based on the entire weight of the support material. The heat absorber may be introduced to the thermoplastic copolymer at any suitable point in the manufacturing process to produce the support material, such as with the charge control agent. For example, the charge control agent and the heat absorber may be melt blended with the thermoplastic copolymer, prior to subjecting the blended materials to grinding, micronization, and/or classification.

The support material may also include one or more additional additives, such as colorants (e.g., pigments and dyes in addition to, or alternatively to, the heat absorbers), polymer stabilizers (e.g., antioxidants, light stabilizers, ultraviolet absorbers, and antiozonants), biodegradable additives, and combinations thereof. In embodiments that incorporate additional additives, the additional additives may collectively constitute from about 0.1% by weight to about 20% by weight of the support material, more preferably from about 0.2% by weight to about 10% by weight, and even more preferably from about 0.5% by weight to about 5% by weight, based on the entire weight of the support material. These materials may also be introduced to the thermoplastic copolymer at any suitable point in the manufacturing process to produce the support material, such as during the melt blending with the charge control agent and/or heat absorber.

For use in electrophotography-based additive manufacturing systems (e.g., system 10), the support material has a controlled average particle size and a narrow particle size distribution, which are preferably similar to or substantially the same as those of the part material. The D50 particle sizes for the support material are preferably within about 15 micrometers of the D50 particle size of the part material, more preferably within about 10 micrometers, and even more preferably within about 5 micrometers, where the particle sizes and particle size distributions are determined pursuant to the Particle Size and Particle Size Distribution standard described below. For example, preferred D50 particles sizes for the support material include those up to about 100 micrometers if desired, more preferably from about 10 micrometers to about 30 micrometers, more preferably from about 10 micrometers to about 20 micrometers, and even more preferably from about 10 micrometers to about 15 micrometers.

Additionally, the particle size distributions for the support material, as specified by the parameters D90/D50 particle size distributions and D50/D10 particle size distributions, each preferably range from about 1.00 to 1.40, more preferably from about 1.10 and to about 1.35, and even more preferably from about 1.15 to about 1.25. Moreover, the particle size distribution for the support material is preferably set such that the geometric standard deviation $\sigma_g$ preferably meets the criteria pursuant to the following Equation 1:

$$\sigma_g \sim \frac{D90}{D50} \sim \frac{D50}{D10}$$

In other words, the D90/D50 particle size distributions and D50/D10 particle size distributions are preferably the same value or close to the same value, such as within about 10% of each other, and more preferably within about 5% of each other.

The support material may be manufactured by polymerizing or otherwise providing the thermoplastic copolymer, melt blending the thermoplastic copolymer with the charge control agent, and optionally with the heat absorber and/or any additional additives, and then grinding, micronizing and/or classifying the resulting material to attain a powder having the above-discussed particle sizes and particle size distributions. Some additional materials, such as the flow control agent, may be blended to the resulting powder under high shear, if desired. This uniformly distributes, coats, and partially embeds the flow control agent(s) into the individual particles of the support material, without significantly altering the particle size or particle size distribution.

It has also been found that the formulated support material, and the thermoplastic copolymer in particular, are fairly brittle. This renders the support material useful in powder form for electrophotography-based additive manufacturing systems, but less desirable for filament-based additive manufacturing techniques, such as the extrusion-based technique developed by Stratasys, Inc., Eden Prairie, Minn., under the trademarks "FUSED DEPOSITION MODELING" and "FDM". It is believed that the brittle nature of the formulated support material, if provided in filament form without any corrective additives, will readily fracture or break while traveling from a consumable container to a liquefier of the extrusion-based system.

The formulated support material may then be filled into a cartridge or other suitable container for use with EP engine 12s in system 10. For example, the formulated support material may be supplied in a cartridge, which may be interchangeably connected to a hopper of development station 58. In this embodiment, the formulated support material may be filled into development station 58 for mixing with the carrier particles, which may be retained in development station 58. Development station 58 may also include standard toner development cartridge components, such as a housing, delivery mechanism, communication circuit, and the like.

The carrier particles in development station 58 may be any suitable magnetizable carrier particles for charging the support material, such as carrier particles having strontium ferrite cores with polymer coatings. The cores are typically larger in size than the particles of the support material, such as averaging from about 20 micrometers to about 25 micrometers in diameter. The polymer coatings may vary depending on the Q/M ratios desired for the support material. Examples of suitable polymer coatings include poly(methyl methacrylate) (PMMA) for negative charging, or poly(vinylidene fluoride) (PVDF) for positive charging. Suitable weight ratios of the support material to the carrier particles in development station or cartridge 58 include those discussed above.

Alternatively, development station 58 itself may be an interchangeable cartridge device that retains the supply of the support material. In further alternative embodiments, EP engine 12s itself may be an interchangeable device that retains the supply of the support material.

When the support material is loaded to system 10, system 10 may then perform printing operations with the support material to print support structures (e.g., support structure 82) in coordination with 3D parts (e.g., 3D part 80). For instance, the layers 64s of support structure 82 may be developed from the support material 66s with EP engine 12s and transferred to layer transfusion assembly 20 along with layers 64p of the developed part material 66p, via belt 22. Because the part and support materials have similar or substantially the same Q/M ratios, belt 22 may be electrostatically attract both layers 64p and 66p with the biases of the same magnitude and sign.

Upon reaching layer transfusion assembly the combined layer 64 (of layers 64p and 64s) are heated and transfused to print 3D part 80 and support structure 82 in a layer-by-layer manner using an additive manufacturing technique. As discussed above, because the part and support materials have similar or substantially the same thermal properties and melt rheologies, the part and support materials may be transfused in a single step, rather than requiring separate and different thermal transfusion steps. Additionally, the prior anhydride conversion step during the production of the support material prevents the support material from undesirably undergoing an additional anhydride conversion reaction during the layer transfusion step, which can otherwise impair part quality.

Furthermore, the support material exhibits good adhesion to part materials, particularly with ABS part materials. This allows support structure 82 to anchor the layers of 3D part 80 to build platen 68, which reduces distortions and curling stresses that may apply to 3D part 80 upon cooling down, and also provides good overhang support for 3D part 80.

Compositionally, the resulting support structure (e.g., support structure 82) includes the thermoplastic copolymer, the charge control agent, and optionally, any heat absorber, flow control agent, and/or any additional additives. Furthermore, if desired, the transfusion steps with layer transfusion assembly 20 may provide part densities that are greater than those achievable from support materials with other fusion-based additive manufacturing techniques, such as the extrusion-based technique developed by Stratasys, Inc., Eden Prairie, Minn., under the trademarks "FUSED DEPOSITION MODELING" and "FDM".

Additionally, the thermoplastic copolymer in the support structure has substantially the same carboxylic acid group-to-anhydride group ratio as that of the support material provided to system 10 (i.e., prior to printing). As discussed above, this is due to the anhydride conversion step that was performed during the manufacture of the support material, which preferably converted the carboxylic acid groups of the thermoplastic copolymer to anhydride groups to the fullest extent possible. Furthermore, the support structure is soluble in an aqueous solution, such as an aqueous alkaline solution, to provide a hands-free support removal process, as discussed above.

As mentioned above, the support material of the present disclosure is particularly suitable for use with the ABS part material disclosed in co-filed U.S. patent application Ser. No. 13/944,472, entitled "ABS Part Material For Electrophotography-Based Additive Manufacturing". For example the ABS part material may include an ABS copolymer, a charge control agent, a heat absorber, and optionally, one or more additional additives, such as a flow control agent. The ABS copolymer preferably includes acrylonitrile units (derived from acrylonitrile), butadiene units (derived from butadiene), and aromatic units (derived from an ethylenically-unsaturated aromatic monomer, preferably styrene).

Collectively (prior to removal of the support structure), the 3D part (e.g., 3D part 80) printed from the ABS part material and the support structure (e.g., support structure 82) printed from the support material of the present disclosure may be provided as an "object" where the 3D part and support structure are adhered to each other. Prior to removal of the support structure from the 3D part, the support structure may support overhanging features of the 3D part, significant angular slopes exist in the 3D part, areas where it is essential to also preserve delicate features in the 3D part, such as small orifices or controlled pore structures, and in some situations, to laterally encase the 3D part.

Property Analysis and Characterization Procedures

Various properties and characteristics of the part and support materials described herein may be evaluated by various testing procedures as described below:

1. Glass Transition Temperature

The glass transition temperature is determined using the classical ASTM method employing Differential Scanning calorimetry (DSC) ASTM D3418-12e1 and is reported in degrees Celsius. The test is performed with a DSC analyzer commercially available under the tradename "SEIKO EXSTAR 6000" from Seiko Instruments, Inc., Tokyo, Japan, with a 10-milligram sample of the support material copolymer. The data is analyzed using software commercially available under the tradenames "DSC Measurement V 5.7" and "DSC Analysis V5.5", also from Seiko Instruments, Inc., Tokyo, Japan. The temperature profile for the test includes (i) 25° C. to 160° C. heating rate 10 Kelvin/minute (first heating period), (ii) 160° C. to 20° C. cooling rate 10 Kelvin/minute, and (iii) 20° C. to 260° C. heating rate 10 Kelvin/minute (second heating period). The glass transition temperature is determined using only the heat flow characteristics of the second heating period (iii).

2. Particle Size and Particle Size Distribution

Particle sizes and particle size distributions are measured using a particle size analyzer commercially available under the tradename "COULTER MULTISIZER II ANALYZER" from Beckman Coulter, Inc., Brea, Calif. The particle sizes are measured on a volumetric-basis based on the D50 particles size, D10 particle size, and D90 particles size parameters. For example, a D50 particle size of 10.0 micrometers for a sample of particles means that 50% of the particles in the sample are larger than 10.0 micrometers, and 50% of the particles in the sample are smaller than 10.0 micrometers. Similarly, a D10 particle size of 9.0 micrometers for a sample of particles means that 10% of the particles in the sample are smaller than 9.0 micrometers. Moreover, a D90 particle size of 12.0 micrometers for a sample of particles means that 90% of the particles in the sample are smaller than 12.0 micrometers.

Particle size distributions are determined based on the D90/D50 distributions and the D50/D10 distributions. For example, a D50 particle size of 10.0 micrometers, a D10 particle size of 9.0 micrometers, and a D90 particle size of 12.0 micrometers provides a D90/D50 distribution of 1.2, and a D50/D10 distribution of 1.1.

As mentioned above, the geometric standard deviation $\sigma_g$ preferably meets the criteria pursuant to the above-shown Equation 1, where the D90/D50 distributions and D50/D10 distributions are preferably the same value or close to the same value. The closeness of the D90/D50 distributions and D50/D10 distributions are determined by the ratio of the distributions. For example, a D90/D50 distribution of 1.2 and a D50/D10 distribution of 1.1 provides a ratio of 1.2/1.1=1.09, or about a 9% difference.

3. Triboelectric Charging

The triboelectric or electrostatic charging properties of powder-based materials for use in electrophotography-based additive manufacturing systems, such as system 10, may be determined with the following technique. A test sample of 7 parts by weight of the powder-based material is agitated in a clean dry glass bottle with 93 parts by weight of carrier particles. The carrier particles include a magnetized 22-micrometer core of strontium ferrite coated with 1.25% by weight of a polymer coating of poly(methyl methacrylate) (PMMA) for negative charging, or poly(vinylidene fluoride) (PVDF) for positive charging.

The mixture of the powder-based material and the carrier particles is agitated 25° C. on a jar roller for 45 minutes to ensure complete mixing of the carrier particles and the powder-based material, and to ensure equilibration of the Q/M ratios. This mixing simulates the mixing process that occurs in a development station of the electrophotography engine when the part or support materials are added to the carrier particles.

A sample of the mixture is then quantitatively analyzed with a TEC-3 Triboelectric Charge Analyzer (available from Torrey Pines Research, Fairport, N.Y.). This analyzer uses electric fields to strip the electrostatic powder from the carrier particle surface, and a rotating high-strength, planar multi-pole magnet to constrain the (magnetizable or permanently magnetized) carrier beads to a bottom electrode.

A 0.7-gram sample of the mixture (sample powder and carrier particles) is placed onto a clean stainless steel disc, which serves as the bottom electrode in an electrostatic plate-out experiment across a gap, under the influence of an applied electric field. This bottom electrode is mounted and positioned above the rotating multi-pole magnet, and a clean top plate disc electrode is mounted securely above the bottom plate, and parallel to it, so as to provide a controlled gap of 5 millimeters between the top and bottom electrode plates, using insulating polytetrafluoroethylene (PTFE under tradename "TEFLON") spacers at the electrodes' periphery.

If the powder is expected to charge negatively, a direct-current voltage of +1,500 volts is applied across the electrodes, and the magnetic stirrer is activated to rotate at 1500 rpm, so as to gently keep the carrier and powder under test constrained, but also slightly agitated on the bottom electrode, during the measurement. Alternatively, if the powder is expected to charge positively, then a negative bias voltage of −1,500 volts is applied. In either case, the applied electric field causes the powder to strip from the carrier, in the powder/carrier mixture, and to transfer to the top electrode, over a defined time period.

The stripped powder under test is deposited on the top electrode, and the induced accumulated charge on the top plate is measured using an electrometer. The amount of powder transferred to the top electrode is weighed, and compared to the theoretical percentage in the original carrier powder mix. The carrier remains on the bottom plate due to the magnetic forces constraining it.

The total charge on the top plate and the known weight of transferred electrostatic powder are used to calculate the Q/M ratio of the test powder, and to also check that all the electrostatic powder has transferred from the carrier, according to the theoretical amount originally mixed with the carrier beads. The time taken for complete powder transfer to the top plate, and the percent efficiency of the powder transfer process are also measured.

4. Powder Flowability

As discussed above, the part and support materials of the present disclosure preferably exhibit good powder flow properties. This reduces or prevents blockage or flow restrictions of the part or support material during the replenishment feeding, which can otherwise inhibit the supply of the part or support material to the carrier particles in the development station. The powder flowability of a sample material is qualitatively measured by visually observing the flowability of the powder in comparison to commercially-available toners utilized in two-dimensional electrophotography processes, which are rated as having "good flow" or "very good flow".

5. Melt Rheology

Preferably, the melt rheologies of the part and support materials are substantially the same as the melt rheologies of their respective copolymers, and are preferably not detrimentally affected by the other additives. Additionally, as discussed above, the part and support materials for use with electrophotography-based additive manufacturing systems (e.g., system 10) preferably have similar melt rheologies.

Melt rheologies of the part and support materials of the present disclosure, and their respective copolymers, are measured based on their melt flow indices over a range of temperatures. The melt flow indices are measured using a rheometer commercially available under the tradename "SHIMADZU CFT-500D" Flowtester Capillary Rheometer from Shimadzu Corporation, Tokyo, Japan. During each test, a 2-gram sample is loaded to the rheometer pursuant to standard operation of the rheometer, and the temperature of the sample is increased to 50° C. to cause a slight compacting of the sample.

Figure 6:
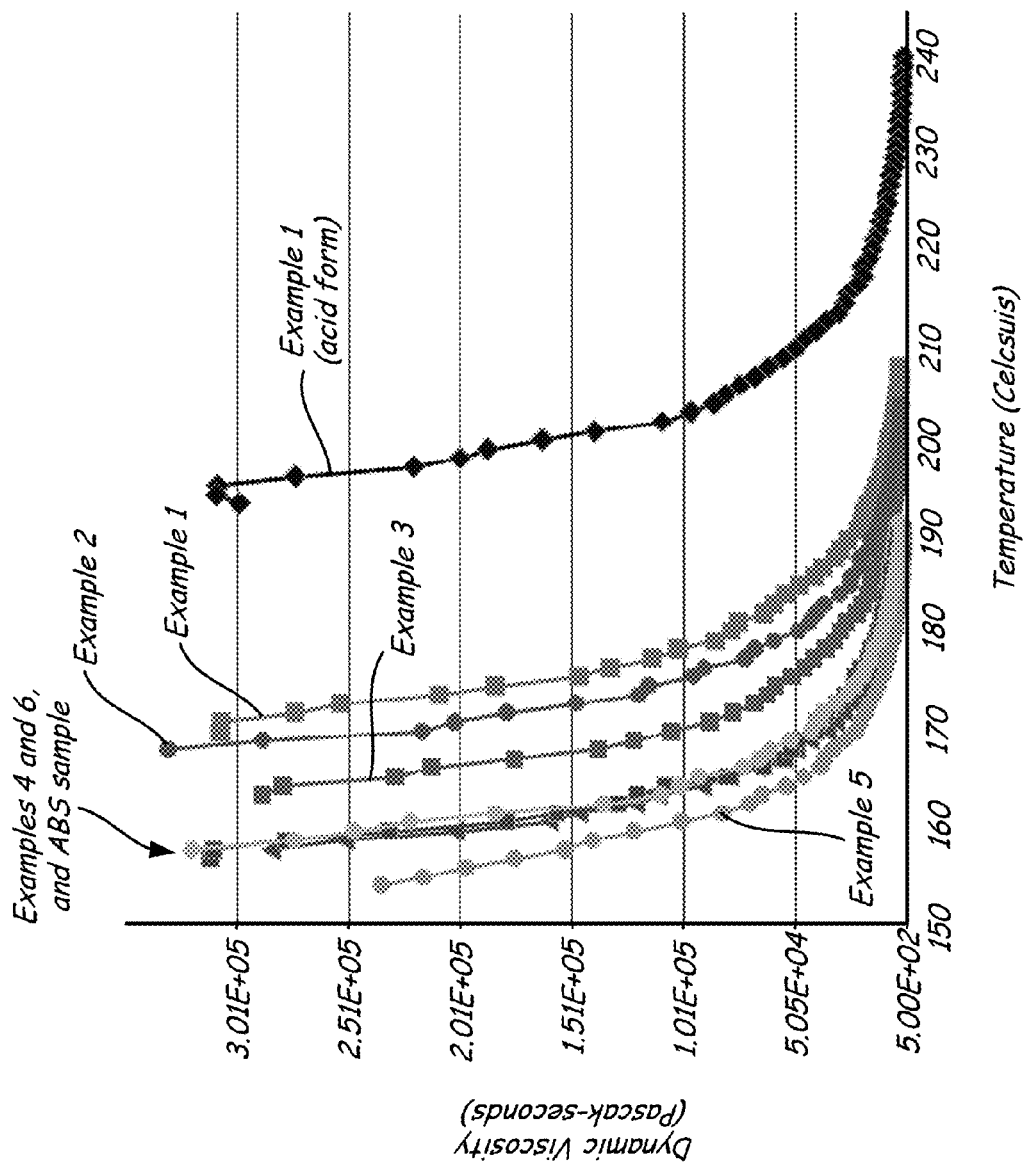
FIG. 6 is a plot of dynamic viscosity versus temperature for example support material copolymers, illustrating how molecular weight and anhydride conversion affects melt rheology behaviors of the copolymers.
Figure 7:
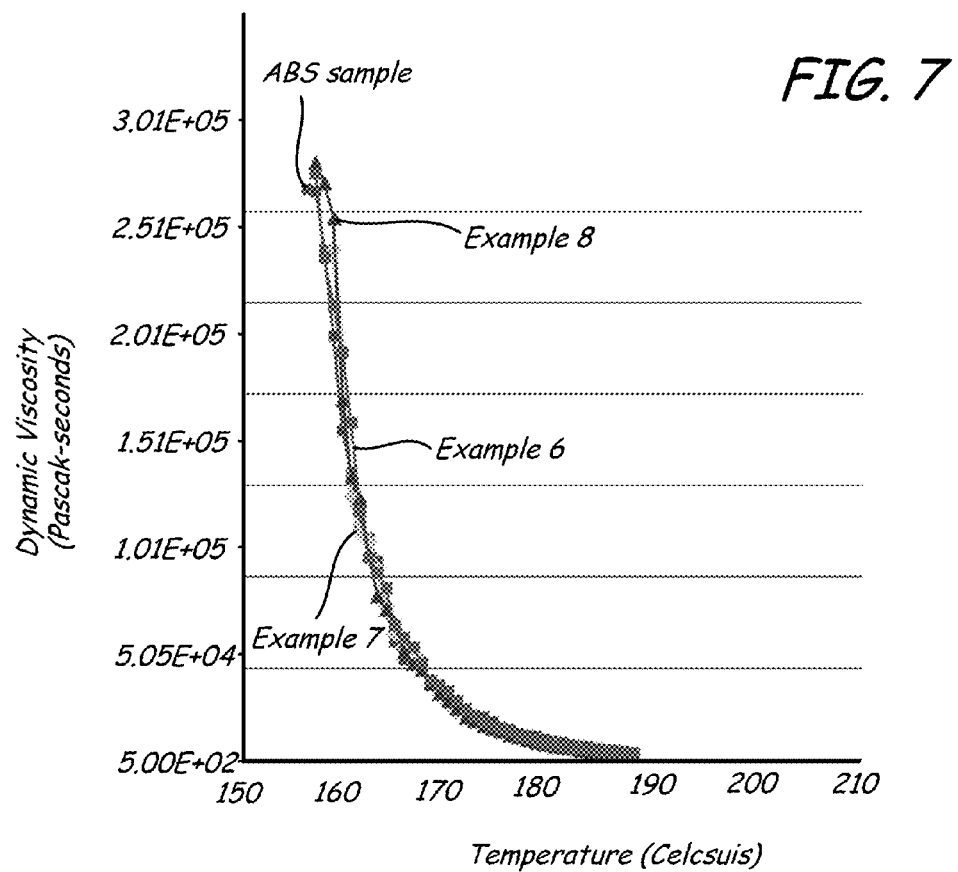
FIG. 7 is a plot of dynamic viscosity versus temperature for additional example support material copolymers produced in larger-scale batches, illustrating melt rheology behaviors of the copolymers.
Figure 8:
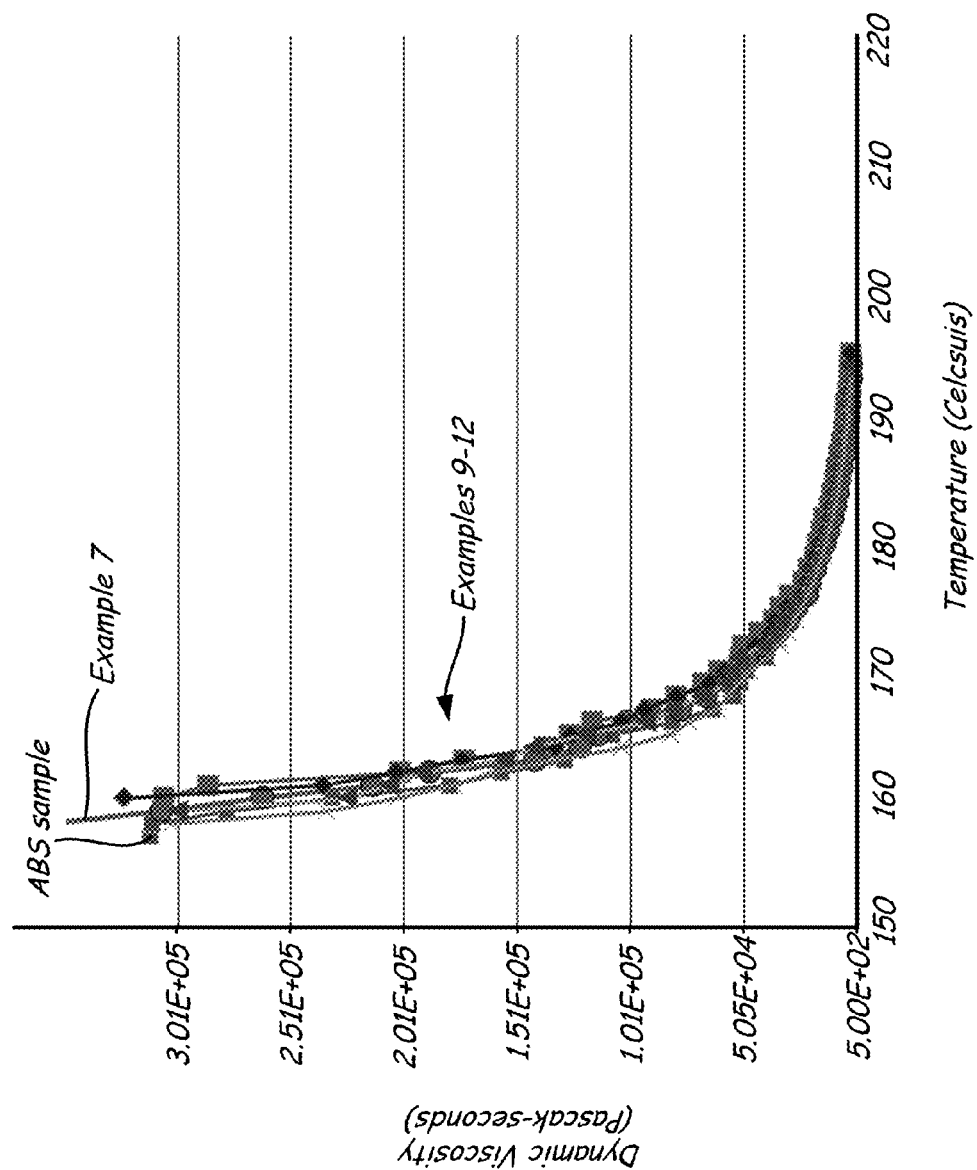
FIG. 8 is a plot of dynamic viscosity versus temperature for additional example support material copolymers with heat absorbers blended at different temperatures, illustrating melt rheology behaviors of the copolymers.

The temperature is then increased from 50° C. at a rate of 5° C. per minute, allowing the sample to first soften and then flow. The rheometer measures the sample viscosity using the flow resistance of the melt to flow through a small die orifice, as a piston of the rheometer is driven through a cylinder. The rheometer records the softening point, the temperature at which flow begins, and the rate at which flow increases as a result of the temperature increase, until the cylinder is exhausted of sample melt. The rheometer also calculates the apparent viscosity in Pascal-seconds at each temperature point in the ramp. From this data, the apparent viscosity versus temperature profile can be determined, such as shown in FIGS. 6-8, for example.

6. Copolymer Composition

The molecular composition and the respective acid and anhydride content of the thermoplastic copolymer of the support material is determined using proton nuclear magnetic resonance (NMR) spectroscopy. The copolymer sample preparation involves dissolving about 40 milligrams of the thermoplastic copolymer in 0.7 milliliters of a dimethyl sulfoxide (dmso)-$d_6$ solvent using ultrasonification, where the thermoplastic copolymer in powder, pellet, or large chunk form is pulverized to fine particles to assist in the dissolution.

Spectral data is recorded on a proton NMR spectrometer commercially available under the tradename "BRUKER AV700" Spectrometer from Bruker Corporation, Billerica, Mass., which is equipped with a cryoprobe. The proton NMR spectrum is recorded at 700.23 megahertz, and sample temperature is maintained at 25° C. using a Bruker digital variable temperature unit.

The analysis is performed by initially cleaning the sample to remove any significant amounts of other aromatic species or residual monomers. The cleaning involves washing or re-suspending in the thermoplastic copolymer sample in heptane or hexane, followed by filtration and drying under vacuum at 75° C. This facilitates accurate integrations of the key signals in the spectrum.

Two preliminary scans are then conducted on the cleaned sample with the proton NMR spectrometer, which allows a steady state to be attained, followed by 32 co-added 30-degree pulse transients, resulting in a good signal-to-noise ratio. Each pulse acquisition time is 2.94 seconds, with a delay of 2.0 seconds between pulses, for a total recycle time of 4.94 seconds. The data is processed using zero-filling and a 0.2 hertz line broadening apodization function. The spectral width is 16.0 parts-per-million (ppm), spanning −2.0 ppm to 14.0 ppm. The spectrum is referenced to residual protons in the deuterated solvent, which occur as a quintet at 2.50 ppm for the dmso-$d_6$ solvent. Integrals are relative to each other, on a molar basis.

Figure 5:
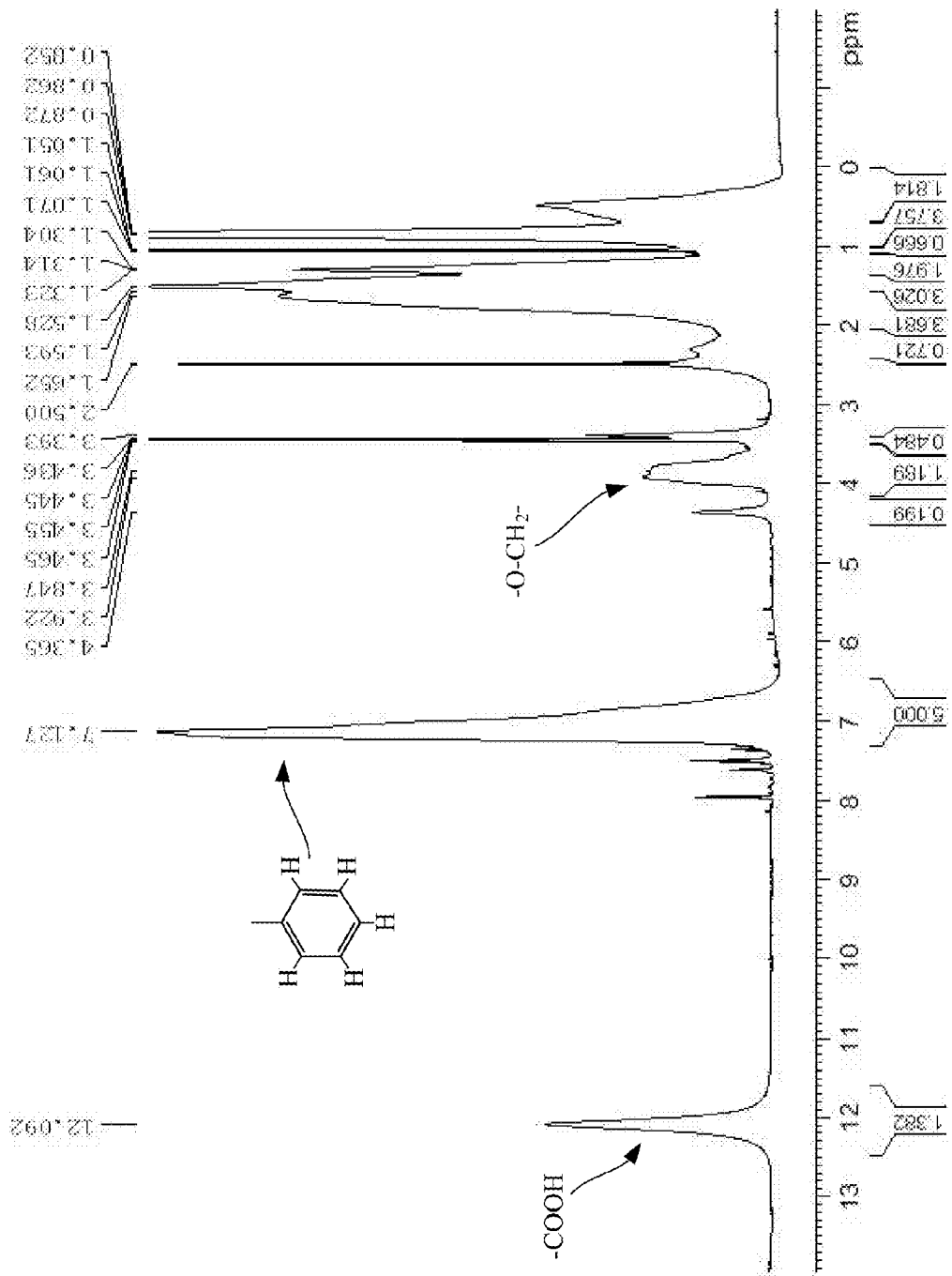
FIG. 5 is an example proton NMR spectrum of an example support material copolymer in acid form.

FIG. 5 illustrates an example proton NMR spectrum for a thermoplastic copolymer polymerized from styrene, n-butyl acrylate, and methacrylic acid, in an ethanol solution polymerization, where the peak at about 12 ppm is due to the single proton of the carboxylic acid group from the methacrylic acid, the peak at about 7 ppm is due to the five protons of the aromatic ring from the styrene monomer, and the peak at about 3.5 ppm to 4.0 ppm, which is typically well resolved in the spectrum, is due to the two protons of the methylene group adjacent to oxygen atom in the ester group from the n-butyl acrylate.

It is useful to deliberately set the aromatic ring peak to integrate to 5.0 protons as a reference. Integration of these three areas allows the molar ratio of the three monomers to be calculated, and assumes that all of the styrene monomers (or other aromatic monomers) have been incorporated into the polymer. Thus, it is possible to calculate the copolymer composition, prior to anhydride conversion, relative to the molar ratio of the starting theoretical monomer composition. Likewise, from this spectrum, and comparison to the spectrum of any anhydride converted material, the integration of the peak at about 12 ppm will decrease relative to aromatic ring peak at about 7.0 ppm, where the signal for the aromatic ring peak at 7 ppm is again deliberately set to integrate to 5.0 protons. From this, the percent conversion of the carboxylic acid groups to anhydride groups can be calculated. Provided that the copolymer is not heated above about 260° C. during the anhydride-conversion step, no decomposition of the copolymer or loss of monomers is typically observed.

7. Molecular Weight

The molecular weight of the support material copolymer is determined using a Gel Permeation Chromatography (GPC) technique with a GPC instrument that includes a high-performance liquid chromatography (HPLC) solvent pump, fully automated sampling equipment, separation columns, and refractive index (RI)-detector.

The copolymer sample is prepared by dissolving 10-15 milligrams of the thermoplastic copolymer in 3 milliliters of a tetrahydrofuran (THF) solvent that contains 0.1% by weight of benzophenone. The copolymer solution is then filtered through a 0.45 micron filter, and run through separation columns of the GPC spectrometer with HPLC-grade THF solvent with 0.1% by volume of trifluoroacetic acid added. The trifluoroacetic acid prevents interaction and bonding of carboxylic acid groups of the thermoplastic copolymer with the column packing, which can otherwise cause discrepancies in elution times.

The three separation columns include: (i) a 50 millimeter (mm)×13 mm column packed with a 5-micrometer styrene-divinylbenzene (SDV) copolymer network, (ii) a 300 mm×13 mm column packed with a 102-Angstrom SDV copolymer network, and (iii) a 300 mm×13 mm column packed with a 104-Angstrom SDV copolymer network. GPC data is evaluated relative to known polystyrene standards with elution time correction using benzophenone as an internal standard. The data is analyzed using software commercially available under the tradename "WIN GPC V 6.10" from Polymer Standards Service-USA, Inc., Amherst, Mass.

8. Acid Value

The acid value or total acid content of the thermoplastic copolymer (the sum of acid and anhydride groups) is determined by titration as follows: A 300 milligram sample of the copolymer is dissolved in a solution of 30 milliliters of analytical-grade ethanol, and 10.0 milliliters of 0.1 N (normality) sodium hydroxide (NaOH). The test is performed using a potentiometric titration procedure with 0.1 N hydrochloric acid (HCl) using a titration system commercially available under the tradename "TITROLINE ALPHA PLUS" with a pH-sensitive electrode commercially available under the tradename "H 62", both from Schott AG, Mainz, Germany.

Each tested sample is analyzed by a fully automated dynamic titration procedure, and is tested in duplicate. The data is evaluated using software commercially available under the tradename "TITRISOFT" Vers.2.5 software, also from Schott AG, Mainz, Germany. It is noted that this is a "back-titration" after conversion of all original acidic functions into sodium salts, using excess sodium hydroxide. The initially clear copolymer solution becomes slightly turbid during the addition of the HCl solution, which is observable at pH's less than about 6-8. However, the evaluation of the signal (a derivative of pH-change with the volume of HCl added) is unaffected by this precipitation effect.

EXAMPLES

The present disclosure is more particularly described in the following examples that are intended as illustrations only, since numerous modifications and variations within the scope of the present disclosure will be apparent to those skilled in the art.

1. Example 1

The thermoplastic copolymers of Examples 1-6 were each prepared using the same technique, where the amounts of the polymerization initiator were varied to specifically modify the molecular weights of the copolymers. For each thermoplastic copolymer, the process involved charging 17.0 grams of styrene (34% by weight of monomers), 12.5 grams of n-butyl acrylate (25% by weight of monomers), and 20.5 grams of methacrylic acid (41% by weight of monomers), along with 35.0 grams of ethanol, to a 250-milliliter, 3-neck flask, equipped with inlet tubing for a nitrogen gas line, a reflux condenser, and a mechanical stirrer. The monomers were each commercially available under the tradename "ACROS ORGANICS" from Fischer Scientific, Inc., Pittsburgh, Pa.

The resulting monomer solution was purged with nitrogen for 30 minutes by bubbling the nitrogen gas through the liquid, and a slow flow of nitrogen was then maintained during the whole polymerization procedure. The flask was then placed in a preheated oil bath maintained at 82° C., and after a 10 minute period, a first addition of a polymerization initiator was added to the reaction mixture. The polymerization initiator was a 40% suspension of dibenzoyl peroxide in water commercially available under the tradename "PERKADOX L-W40" from Akzo Nobel N.V., Amsterdam, Netherlands.

The resulting polymerization reaction was then stirred for two hours at 82° C. A viscous product was formed after that period. Then, a second addition of the polymerization initiator was added to the reaction mixture. The reaction mixture was then stirred for further two hours at 82° C., followed by a third addition of the polymerization initiator. The polymerization was then allowed to continue for a further four hours at 82° C.

Table 1 lists the amounts of the dibenzoyl peroxide polymerization initiator that were added to the monomers during each of the first, second, and third additions, where the addition of initiator in three separate steps was performed to avoid or mitigate any excessive exotherm from occurring during the polymerization reaction, and to ensure that the polymerization proceeded to completion in each case.

TABLE 1

| Example | Initiator - first addition (mg) | Initiator - second addition (mg) | Initiator - third addition (mg) | Initiator Total (mg) |
|---|---|---|---|---|
| Example 1 | 450 | 172 | 172 | 794 |
| Example 2 | 585 | 223 | 172 | 980 |
| Example 3 | 676 | 256 | 172 | 1104 |
| Example 4 | 1012 | 386 | 172 | 1570 |
| Example 5 | 1520 | 580 | 172 | 2272 |
| Example 6 | 1012 | 386 | 172 | 1570 |

After the polymerization was completed, the resulting viscous polymer solution was diluted with 35 grams of ethanol and allowed to cool to room temperature. Next, the copolymer solution in ethanol was precipitated into 1.5 liters of cyclohexane under vigorous stirring. A sticky material was obtained that separated to the bottom. The excess cyclohexane was then decanted and the resulting thermoplastic copolymer was stirred twice with 500 milliliters of cyclohexane for two hours using a mechanical stirrer.

The solvent was then separated and the sticky thermoplastic copolymer was dried under vacuum at 100° C. overnight. A glassy thermoplastic copolymer was then recovered and ground into powder form. The resultant powder was dried at 100° C. under vacuum until a constant weight was obtained. An analysis of the composition of the thermoplastic copolymers using the Copolymer Composition Test described above showed that each thermoplastic copolymer of Examples 1-6 was in acid form (i.e., no anhydride groups), and had monomer unit concentrations as shown below in Table 2.

TABLE 2

| Example | Styrene (percent by weight) | Butyl acrylate (percent by weight) | Methacrylic acid (percent by weight) |
|---|---|---|---|
| Example 1 | 36.0 | 24.0 | 40.0 |
| Example 2 | 35.5 | 24.5 | 40.0 |
| Example 3 | 34.0 | 25.0 | 41.0 |
| Example 4 | 34.5 | 24.5 | 41.0 |
| Example 5 | 34.0 | 25.0 | 41.0 |
| Example 6 | 34.0 | 25.0 | 41.0 |

The molecular weight was also measured pursuant to the Molecular Weight test described above. Table 3 lists the resulting weight-average molecular weights (Mw), the number-average molecular weights (Mn), and the ratios thereof (Mw/Mn) for the thermoplastic copolymers of Examples 1-6 in acid form.

TABLE 3

| Example | Molecular weight (Mw) | Molecular weight (Mn) | Mw/Mn |
|---|---|---|---|
| Example 1 | 115,000 | 56,030 | 2.05 |
| Example 2 | 95,000 | 47,000 | 2.02 |
| Example 3 | 83,000 | 38,020 | 2.18 |
| Example 4 | 71,390 | 32,752 | 2.18 |
| Example 5 | 60,000 | 29,000 | 2.07 |
| Example 6 | 71,577 | 35,560 | 2.01 |

The percent yield and glass transition temperature of each thermoplastic copolymer of Examples 1-6 in acid form was also measured, where the percent yields were each based on the weight of the thermoplastic copolymer relative to the total weight of monomers used in the polymerization reaction. The glass transition temperatures were measured pursuant to the Glass Transition Temperature test described above. Table 4 lists the percent yield and glass transition temperature of each thermoplastic copolymer of Examples 1-6 in acid form.

TABLE 4

| Example | Percent yield | Glass transition temperature (° C.) |
|---|---|---|
| Example 1 | 97% | 148 |
| Example 2 | >98% | 145 |
| Example 3 | >98% | 145 |
| Example 4 | >98% | 143 |
| Example 5 | 97% | 144 |
| Example 6 | >98% | 144 |

Each thermoplastic copolymer was then subjected to an anhydride conversion step, which involved heating the thermoplastic copolymer to 230° C. for 30 minutes in an air circulating oven. The extent of the anhydride conversion was analyzed using the Copolymer Composition Test described above. For each thermoplastic copolymer, it was found that no further anhydride conversion occurred after heating for 30 minutes.

Additionally, the acid values for the thermoplastic copolymers of Examples 1-6 (sum of acid and anhydride groups) were determined pursuant to the Acid Value test described above. Moreover, the glass transition temperatures of the thermoplastic copolymers of Examples 1-6 in anhydride form were measured pursuant to the Glass Transition Temperature test described above. Table 5 lists the percent anhydride conversion, the acid values, and the glass transition temperatures (in anhydride form) for the copolymers of Examples 1-6.

TABLE 5

| Example | Percent anhydride conversion | Acid Value | Glass transition temperature (° C.) (anhydride form) |
| --- | --- | --- | --- |
| Example 1 | 65% | 40.8 | 115 |
| Example 2 | 63% | 40.5 | 113 |
| Example 3 | 61% | 41 | 110 |
| Example 4 | 64% | 41.2 | 107 |
| Example 5 | 64% | 40.9 | 105 |
| Example 6 | 65% | 41.5 | 108 |

The percent anhydride conversions shown in Table 5 corresponded to the "maximum anhydride conversions" that the thermoplastic copolymers were capable of achieving. Additionally, a comparison of the glass transition temperatures shown in Table 4 (i.e., acid form) and the glass transition temperatures shown in Table 5 (i.e., anhydride form) illustrates how the anhydride conversion process lowers the glass transition temperature of the resulting thermoplastic copolymer. As discussed above, this is believed to correspond to a change in the molecular weight and melt rheology of the thermoplastic copolymer.

The thermoplastic copolymers of Examples 1-6 were also tested pursuant to the Melt Rheology test described above to determine how molecular weight and anhydride conversion affected the melt rheologies of the copolymers. FIG. 6 is a plot of the resulting dynamic viscosities versus temperature for the tests, where a sample of the thermoplastic copolymer of Example 1 in acid form (i.e., prior to anhydride conversion) was also tested for comparison purposes. Furthermore an ABS part material having 1% by weight of a charge control agent, and 2.5% of a carbon black heat absorber, as described in Example 4 of co-filed U.S. patent application Ser. No. 13/944,472, entitled "ABS Part Material For Electrophotography-Based Additive Manufacturing", was also tested.

As shown in FIG. 6, the anhydride conversion step reduced the dynamic viscosity of the thermoplastic copolymer of Example 1. However, the melt rheology of the thermoplastic copolymer of Example 1 in anhydride form was still dissimilar from that of the ABS part material tested. In comparison, the thermoplastic copolymers of Examples 4 and 6 in anhydride form exhibited the best matches to the ABS part material for melt rheologies. Thus, this defines the target molecular weight and copolymer composition that is the most complimentary support material copolymer for printing with the ABS part material in an electrophotography-based additive manufacturing system (e.g., system 10). The glass transition temperatures of the thermoplastic copolymers of Examples 4 and 6, in their thermally-stable anhydride forms, were also good matches for the ABS part material (i.e., ranging from about 106-108° C.).

2. Examples 7 and 8

The above-discussed thermoplastic copolymers of Examples 1-6 were produced in small scale batches for purposes of material testing and printing with an electrophotography-based additive manufacturing system. In comparison, the thermoplastic copolymers of Examples 7 and 8 were each produced in a larger-scale manner to demonstrate that the support material of the present disclosure can be manufactured in a cost-effective manner. The process was performed with the use of a polymer isolation device commercially available under the tradename "ENTEX" Planetary Roller Extruder (PRE) device from ENTEX Rust & Mitschke GmBH, Bochum, Germany. It was found that the PRE device was effective in the removal of the ethanol from the copolymer solution, upon completion of the polymerization. In addition, it was found that the PRE device was capable of performing the maximum anhydride conversion simultaneously with this solvent removal step.

The process for producing the thermoplastic copolymers of Examples 7 and 8 initially involved preconditioning and filling a polymerization vessel (separate from the PRE device). This involved purging the polymerization vessel with nitrogen for 30 minutes, and then charging the polymerization vessel under a slow stream of nitrogen with 122.4 kilograms of styrene (34% by weight of monomers), 90.0 kilograms of n-butyl acrylate (25% by weight of monomers), and 147.6 kilograms of methacrylic acid (41% by weight of monomers), as well as 240.0 kilograms of ethanol (containing 1% by weight of methyl ethyl ketone (MEK)). The monomers were each commercially available under the tradename "ACROS ORGANICS" from Fischer Scientific, Inc., Pittsburgh, Pa. Stirring was then commenced in the polymerization vessel at a rate of 60-80 revolutions-per-minute (rpm).

The stirred polymerization vessel was then heated until a slight boiling of the monomer solution was observed (internal temperature of about 85-86° C., after a time period of 1.5-2 hours), and an emergency stop procedure was in place in the event that the internal temperature reached 90° C. (reaction product would be discarded).

The monomer solution was then stirred for 30 minutes at 85-86° C., and then cooled down to 82° C. A first addition of 3.52 kilograms of the polymerization initiator (a 40% suspension of dibenzoyl peroxide in water commercially available under the tradename "PERKADOX L-W40" from Akzo Nobel N.V., Amsterdam, Netherlands) was then charged to the polymerization vessel, along with 0.25 liters of rinsing water. The monomer solution was then heated to 86° C. and stirred until polymerization reaction started, which resulted in moderate refluxing of the solvent at the condenser (after about 20 to 40 minutes). When solvent refluxing was observed (corresponding to the start of the polymerization reaction), the internal temperature for the polymerization vessel was set to 80° C., and stifling continued for two hours. An exothermic effect was slightly noticeable, which fell off over the two-hour period.

A second addition of 1.09 kilograms of the polymerization initiator was then charged to the polymerization vessel, along with 0.25 liters of rinsing water. The polymerization vessel was then stirred for an additional two hours. During this period, a slight exothermic effect was observed.

A third addition of 1.09 kilograms of the polymerization initiator was then charged to the polymerization vessel, along with 0.25 liters of rinsing water. The polymerization vessel was then stirred for an additional two hours, during which almost no exothermic effect was observed.

After the polymerization reaction was completed, the resulting thermoplastic copolymer was provided in a viscous copolymer solution. A 60-kilogram supply of ethanol was then charged to the polymerization vessel to dilute the copolymer solution. The internal temperature was lowered to 70° C., and the polymerization vessel was then stirred for an additional 1.5 hours. After this period, stifling was continued and the nitrogen flow into the polymerization vessel was stopped, and the polymerization vessel was pressurized with nitrogen to about 2.5-3.0 bars for removal of the copolymer solution.

An analysis of the composition of the thermoplastic copolymers using the Copolymer Composition Test described above showed that each thermoplastic copolymer of Examples 7 and 8 was in acid form (i.e., no anhydride groups), and had monomer unit concentrations as shown below in Table 6.

TABLE 6

| Example | Styrene (percent by weight) | Butyl acrylate (percent by weight) | Methacrylic acid (percent by weight) |
|---|---|---|---|
| Example 7 | 35.0 | 25.0 | 40.0 |
| Example 8 | 35.5 | 23.5 | 41 |

The percent yield and glass transition temperature of each thermoplastic copolymer of Examples 7 and 8 in acid form were also measured, where the percent yields were each based on the weight of the thermoplastic copolymer relative to the total weight of monomers used in the polymerization reaction. The glass transition temperatures were measured pursuant to the Glass Transition Temperature test described above. Table 7 lists the percent yield and glass transition temperature of each copolymer of Examples 7 and 8 in acid form.

TABLE 7

| Example | Percent yield | Glass transition temperature (° C.) |
|---|---|---|
| Example 7 | 98% | 145 |
| Example 8 | >98% | 145 |

The copolymer solution was then fed from the polymerization vessel to the PRE device using a gear pump and heated tubing at a pump rate of about 50 liters/hour. Prior to feeding the copolymer solution, the PRE device was set up to operate with a central spindle speed of 285 rpm, a set temperature for segment 1 and 2 of 190° C., a set temperature for segment 3 and 4 of 230° C., a set temperature for segment 5 and 6 of 220° C., and a set temperature for the die nozzle plate of 240° C.

The copolymer solution fed to the PRE device was extruded initially as a foamy brownish material on the nozzle. This copolymer fraction was discarded. As soon as almost white copolymer foam was observed at the nozzle (due to entrained bubbles), the segments 3 and 4 were adjusted gradually to a vacuum of 200 to 300 millibars. This changed the extrudate into an almost colorless strand, substantially free of bubbles. After a 15-minute period starting when the almost-clear and colorless strand was observed, the extrudate strand was set on a stainless steel, cooling belt and transported to a pelletizer. The pelletizer according cut the received stand into pellets, which were sealed in a bag to exclude moisture.

As mentioned above, it was found that the PRE was effective in the removal of the ethanol from the copolymer solution, upon completion of the polymerization. When the copolymer solution was fed to the PRE device to extrude the stand, the ethanol was distilled off via a reflux condenser and returned to storage tanks for further use. As such, the ethanol was recyclable for use in subsequent polymerization reactions to produce additional batches of the support material copolymer.

As also mentioned above, it was found that the PRE device was capable of performing the anhydride conversion step simultaneously with the ethanol removal step. This was confirmed by analysis of the composition of the thermoplastic copolymer using the Copolymer Composition Test described above, which confirmed that the maximum anhydride conversion for each thermoplastic copolymer was achieved.

The acid values for the thermoplastic copolymers of Examples 7 and 8 (sum of acid and anhydride groups) were also determined pursuant to the Acid Value test described above, and the glass transition temperatures of the thermoplastic copolymers of Examples 7 and 8 in anhydride form were also measured pursuant to the Glass Transition Temperature test described above. Table 8 lists the percent anhydride conversion, the acid values, and the glass transition temperatures for the copolymers of Examples 7 and 8.

TABLE 8

| Example | Percent anhydride conversion | Acid value | Glass transition temperature (° C.) |
|---|---|---|---|
| Example 7 | 63% | 41.0 | 109 |
| Example 8 | 62% | 42.3 | 110 |

Accordingly, these results confirmed that the polymerization and isolation of the thermoplastic copolymer, with required anhydride conversion, can be performed on a manufacturing scale, with reproducible results to achieve a cost-effective process.

The thermoplastic copolymers of Examples 6-8 were further tested pursuant to the Melt Rheology test described above to determine how molecular weight and anhydride conversion affected the melt rheologies of the copolymers. FIG. 7 is a plot of the resulting dynamic viscosities versus temperature for the tests, where the above-discussed ABS part material was also tested.

As shown in FIG. 7, the thermoplastic copolymers of Examples 7 and 8 (each in anhydride form) exhibited good matches to the ABS part material for thermal properties and melt rheologies. Thus, the larger-scale manufacturing was suitable for producing the thermoplastic copolymers for use as a support material for the ABS part material. This is in addition to the cost-effective process attainable with the PRE device.

3. Examples 9-12

The thermoplastic copolymer of Example 7 was also blended with a carbon black heat absorber as an enhancement for fusing the powders during a layer transfusion step in an electrophotography-based additive manufacturing system. Accordingly, support materials of Examples 9-12 included the thermoplastic copolymer of Example 7 and 2.5% by weight of carbon black, which was commercially available under the tradename "REGAL 330" from Cabot Corporation, Boston, Mass. The carbon black was melt-blended by twin screw extrusion into the thermoplastic copolymer, at several different temperatures, namely 160° C. for Example 9, 180° C. for Example 10, 200° C. for Example 11, and 230° C. for Example 12. It was also found that no degradation of the molecular weight of the thermoplastic copolymer occurred as a result of the extrusion melt-blending of carbon black into thermoplastic copolymer.

The support materials of Examples 7-12 were measured pursuant to the Melt Rheology test described above to determine how molecular weight and anhydride conversion affected the melt rheologies of the support materials. FIG. 8 is a plot of the resulting dynamic viscosities versus temperature for the tests, where the above-discussed ABS part material was also tested.

As shown in FIG. 8, the incorporation of the carbon black (2.5% by weight) did not have any significant detrimental effects on the melt rheology of the support material, and the support materials of Examples 8-12 continued to exhibit good matches to the ABS part material for thermal properties and melt rheologies. As such, the inclusion of the carbon black at concentrations shown to be effective for use in electrophotography-based additive manufacturing systems allow the resulting support materials to have melt rheologies that are substantially the same as the melt rheologies of the thermoplastic copolymers of the support material, as well as the melt rheologies of the ABS part material.

4. Examples 13-15

The thermoplastic copolymer of Example 7 was also subjected to grinding and micronization to attain a desired particle size and particle size distribution for use in an electrophotography-based additive manufacturing system. This involved grinding the thermoplastic copolymer of Example 7 to about a 300-micrometer size using a granulator commercially available Cumberland, Inc., New Berlin, Wis. For Example 13, the pre-grind of the thermoplastic copolymer was used in neat form (i.e., unblended).

For Example 14, the pre-grind of the thermoplastic copolymer was blended with 2.5% by weight of carbon black in a 40-liter "HENSCHEL" blender (commercially available from Zeppelin Reimelt GmbH, Kassel, Germany), where the carbon black was commercially available under the tradename "REGAL 330" from Cabot Corporation, Boston, Mass. This blend was then fed to a twin-screw extruder for melt-compounding. The average temperatures achieved during the melt compounding at steady state conditions were: zone 1 at 164° C., zone 2 at 164° C., zone 3 at 166° C., zone 4 at 182° C., and a die temperature at 177° C. The extrudate was then ground to about 250 micrometers and subjected to fine screening to remove large particles.

For Example 15, the pre-grind of the thermoplastic copolymer was blended, extruded, ground, and screened in the same manner as for Example, 14, where the blend included the thermoplastic copolymer, 2.5% by weight of the carbon black, and 1.0% by weight of a charge control agent (zinc complex of di-t-butyl salicylate). Table 9 lists the concentrations of the materials for Examples 13-15.

TABLE 9

| Example | Copolymer (percent by weight) | Carbon Black (percent by weight) | Charge Control Agent (percent by weight) |
|---|---|---|---|
| Example 13 | 100.0 | 0.0 | 0.0 |
| Example 14 | 97.5 | 2.5 | 0.0 |
| Example 15 | 96.5 | 2.5 | 1.0 |

Each support material was then subjected to micronization by air-jet milling and classification in an Alpine Jet Mill (Model No. 100 AFG), which was configured in tandem with an Alpine "TURBOPLEX" ATP Air Classifier, each commercially available from Hosokawa Micron Ltd., Cheshire, England. The air classifier had a multi-wheel design, facilitating classification of the powder as a function of the peripheral speed, or the speed of the classifying wheel and the radial speed of the air flowing through the classifying wheel. The powder's fineness was controllable by altering the speed of the classifier wheel. Rejected material was discharged at the bottom of the classifier, and oversized particles were returned to the air-jet mill. Fines were removed to an air bag.

Each support material was run at a steady state grinding rate of 0.5 kilograms per hour for 40 hours. The resulting powder was subjected to two passes of the classifier in order to achieve the specified tolerances in particle size distribution. The optimum speed of the classifier wheel was established to be 10,000 rpm in order to deliver the particle size specifications (reported on a volume basis) as shown in Table 10.

TABLE 10

| Example | D10 | D50 | D90 | D50/ D10 | D90/ D10 | Percent yield (by weight) |
|---|---|---|---|---|---|---|
| Target Specification | 10.0 | 12.0 | 14.4 | 1.2 | 1.2 | — |
| Example 13 | 10.1 | 12.2 | 14.4 | 1.2 | 1.2 | 42% |
| Example 14 | 10.2 | 12.3 | 14.4 | 1.2 | 1.2 | 55% |
| Example 15 | 10.3 | 12.5 | 14.7 | 1.2 | 1.2 | 62% |

Figure 9:
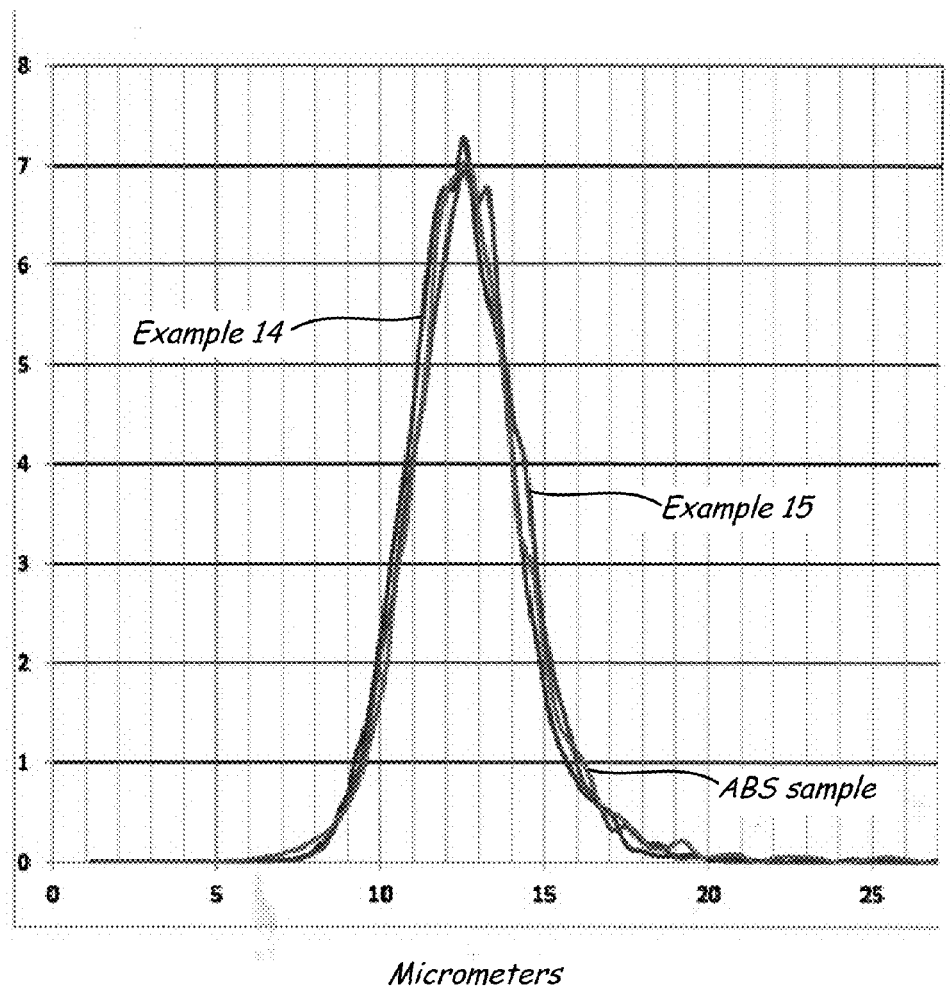
FIG. 9 is a plot of powder particle size distributions for example support materials of the present disclosure.

As shown in Table 10, the materials of Examples 13-15 each exhibited particle sizes and particle size distributions within specification and experimental error. In addition, as illustrated in FIG. 9, the particle sizes and particle size distributions were almost identical to those of the ABS part material. Melt viscosity versus temperature profiles were also measured for each material of Examples 13-15, and each was found to be identical within experimental error to the melt rheological curves described above for the copolymer of Example 11 (containing 2.5% by weight carbon black, and melt processed at 200° C.).

7. Example 16

The classified support material powder from Example 15, containing the thermoplastic copolymer, the carbon black heat absorber, and the charge control agent, was then surface treated with a flow control agent. This involved charging 400 grams of the classified powder from Example 15 into a stainless steel mini "HENSCHEL" blender (commercially available from Zeppelin Reimelt GmbH, Kassel, Germany), along with 2 grams of a dimethyldichlorosilane-treated fumed silica commercially available under the tradename "AEROSIL R972" from Evonik Industries AG, Essen, Germany. The mixture was then blended for several 30-second on/30-second off, high-shear, high-speed blending cycles. The resultant support material of Example 16 exhibited significantly better powder flow properties when compared to the original powder of Example 15. Additionally, the particle size and size distribution were identical to the powder from Example 15.

8. Triboelectric Charging Testing for Examples 13-16

The support materials of Examples 13-16 were subjected to triboelectric charging analysis pursuant to the Triboelectric Charging test described above. Each sample was tested with carrier particles having PMMA coatings, which provided negative charges. Table 11 lists the results of the triboelectric charging tests for the support materials of Examples 13-16.

TABLE 11

| Example | Carrier Particles Coating | Q/M Ratio (μC/g) | Transit Time (seconds) | Transit Efficiency |
|---|---|---|---|---|
| Example 13 | PMMA | −38 ± 1 | >420 | 95% |
| Example 14 | PMMA | −18 ± 1 | 150 | 95% |
| Example 15 | PMMA | −30 ± 1 | 120 | 98% |
| Example 16 | PMMA | −32 ± 1 | 45 | 98% |

As shown in Table 11, the Q/M ratios of the support materials were dependent on the types of carrier particles used. Furthermore, the fastest transit times and greatest powder transit efficiencies were achieved using a combination of a charge control agent and carbon black as internal additives, and the flow control agent as a powder flow surface additive (i.e., Example 16).

9. Printing Runs for Example 16

The support material of Example 16 was also used to print support structures in coordination with 3D parts printed from an ABS part material, using an electrophotography-based additive manufacturing system corresponding to system 10 (without heater 74). The ABS part material included an ABS copolymer, 1% by weight of the charge control agent, 2.5% by weight of the carbon black heat absorber, and 0.5% by weight of the flow control agent, as described in Example 5 of co-filed U.S. patent application Ser. No. 13/944,472, entitled "ABS Part Material For Electrophotography-Based Additive Manufacturing".

During a given printing run, a digital model of a 3D part was sliced into multiple layers, and support layers were then generated to support overhanging regions of the 3D part. Printing information for the sliced layers was then transmitted to the electrophotography-based additive manufacturing system, which was then operated to print the 3D part.

During the printing run, the ABS part material and the support material were each charged and developed in multiple successive layers with an EP engine of the system, where the development drums was each charged at −500 volts. The charge control agents and the flow control agents were sufficient to develop the layers with good material density. The developed layers were then transferred to an intermediary drums charged at +450 volts, and were then transferred to a transfer belt of the system with biasing rollers charged at +2,000 volts. The part and support material layers were then transferred together to the layer transfusion assembly of the system, where the Q/M ratios of the part and support materials were also sufficient to maintain electrostatic attraction of the developed layers to the belt.

At the pre-heater (corresponding to heater 72), each layer was heated by infrared radiation to temperatures ranging from about 180° C. to about 200° C. The heated layers were then pressed between the nip roller and the reciprocating build platen (with the previously-printed layers of the 3D part), where the nip roller was maintained at a temperature of 200° C., and an average nip pressure of about 40 pounds/square-inch (psi). Each layer successfully transferred from the belt and remained adhered to the top surface of the 3D part/support structure. After passing the nip roller, the top surface of the 3D part/support structure was then heated with a post-heater (corresponding to post-heater 76) to further transfuse the layers, and then cooled down with air jets. This process was then repeated for each layer of the 3D part/support structure.

After the printing run was completed, the 3D part/support structure was removed from the system and exhibited good part resolutions upon visual inspection. The 3D part/support structure was then placed in a support removal system commercially available under the tradename "WAVEWASH" from Stratasys, Inc., Eden Prairie, Minn. The support removal system subjected the combined 3D part/support structure to an aqueous alkaline solution under agitation for a standard operating duration. Upon completion, the support structure (from the support material of Example 16) was dissolved away from the 3D part of the ABS part material.

Accordingly, the electrophotography-based additive manufacturing system successfully printed 3D parts and support structures from the ABS part material and the support material of Example 16. This is believed to be due in part to the nearly identical melt viscosity versus temperature profiles, nearly identical glass transition temperatures, and nearly identical triboelectric charging properties of the part and support materials. Furthermore, the layers were developed and transfused at fast printing rates, with good adhesion, allowing the 3D parts and support structures to be printed with short printing durations and thin layers.

Although the present disclosure has been described with reference to preferred embodiments, workers skilled in the art will recognize that changes may be made in form and detail without departing from the spirit and scope of the disclosure.

The invention claimed is:

1. A support material for printing a support structure with an electrophotography-based additive manufacturing system, the support material comprising:
   a composition comprising:
      a thermoplastic copolymer comprising aromatic groups, (meth)acrylate-based ester groups, carboxylic acid groups, and anhydride groups, wherein the copolymer has an anhydride conversion that is at least 90% of a maximum anhydride conversion for the thermoplastic copolymer; and
      a charge control agent;
   wherein the composition is provided in a powder form having a D50 particle size ranging from about 5 micrometers to about 30 micrometers;
   wherein the support material is configured for use in the electrophotography-based additive manufacturing system having a layer transfusion assembly for printing the support structure in a layer-by-layer manner in coordination with printing a three-dimensional part; and
   wherein the composition is at least partially soluble in an aqueous solution.

2. The support material of claim 1, wherein the anhydride conversion of the thermoplastic copolymer is at least 95% of a maximum anhydride conversion for the thermoplastic copolymer.

3. The support material of claim 1, wherein the thermoplastic copolymer is polymerized from monomers comprising an ethylenically-unsaturated aromatic monomer, an alkyl (meth)acrylate, and a (meth)acrylic acid.

4. The support material of claim 3, wherein the ethylenically-unsaturated aromatic monomer comprises styrene, the alkyl(meth)acrylate comprises n-butyl acrylate, and the (meth)acrylic acid comprises methacrylic acid.

5. The support material of claim 1, wherein the D50 particle size ranges from about 10 micrometers to about 20 micrometers.

6. The support material of claim 1, wherein the powder form also has a D90/D50 particle size distribution and a D50/D10 particle size distribution each ranging from about 1.00 to about 1.40.

7. The support material of claim 1, wherein the charge control agent is selected from the group consisting of chromium oxy carboxylic acid complexes, zinc oxy carboxylic acid complexes, aluminum oxy carboxylic acid complexes, and mixtures thereof.

8. The support material of claim 1, and further comprising a heat absorber constituting from about 0.5% by weight to about 10% by weight of the composition.

9. The support material of claim 1, and further comprising a flow control agent constituting from about 0.1% by weight to about 10% by weight of the composition.

10. A method for manufacturing a support material for use in an electrophotography-based additive manufacturing system, the method comprising:
   polymerizing monomers comprising one or more ethylenically-unsaturated aromatic monomers, one or more alkyl(meth)acrylate monomers, and one or more (meth)acrylic acid monomers, to produce a thermoplastic copolymer in acid form, which comprises aromatic groups, (meth)acrylate-based ester groups, and carboxylic acid groups;
   heating the thermoplastic copolymer in acid form to convert a portion of the carboxylic acid groups to anhydride groups with an anhydride conversion that is at least 90% of a maximum anhydride conversion for the thermoplastic copolymer, thereby producing a thermoplastic copolymer in anhydride form;
   blending a charge control agent to the thermoplastic copolymer in anhydride form; and
   forming the blend into a powder form having a D50 particle size ranging from about 5 micrometers to about 30 micrometers.

11. The method of claim 10, wherein the anhydride conversion of the is at least 95% of a maximum anhydride conversion for the thermoplastic copolymer.

12. The method of claim 10, wherein the ethylenically-unsaturated aromatic monomer comprises styrene, the alkyl (meth)acrylate comprises n-butyl acrylate, and the (meth) acrylic acid comprises methacrylic acid.

13. The method of claim 10, and further comprising blending a heat absorber to the thermoplastic copolymer in anhydride form, wherein the heat absorber constitutes a portion of the blend that is formed into the powder form.

14. The method of claim 10, and further comprising surface treating the powder-formed blend with a flow control agent.

15. The method of claim 10, wherein the polymerization of the monomers is performed in a solvent, and wherein heating the thermoplastic copolymer in acid form to convert the portion of the carboxylic acid groups to the anhydride groups also isolates the thermoplastic copolymer from the solvent.

16. A method for printing a support structure with an electrophotography-based additive manufacturing system having an electrophotography engine, a transfer medium, and a layer transfusion assembly, the method comprising:
   providing a support material to the electrophotography-based additive manufacturing system, the support material compositionally comprising a charge control agent and a thermoplastic copolymer having aromatic groups, (meth)acrylate-based ester groups, carboxylic acid groups, and anhydride groups, wherein the thermoplastic copolymer an anhydride conversion that is at least 90% of a maximum anhydride conversion for the thermoplastic copolymer, and wherein the composition is provided in a powder form;
   triboelectrically charging the support material to a Q/M ratio having a negative charge or a positive charge, and a magnitude ranging from about 5 micro-Coulombs/gram to about 50 micro-Coulombs/gram;
   developing layers of the support structure from the charged support material with the electrophotography engine;
   electrostatically attracting the developed layers from the electrophotography engine to the transfer medium;
   moving the attracted layers to the layer transfusion assembly with the transfer medium; and
   transfusing the moved layers to previously-printed layers of the support structure with the layer transfusion assembly.

17. The method of claim 16, wherein the thermoplastic copolymer is polymerized from monomers comprising an ethylenically-unsaturated aromatic monomer, an alkyl (meth) acrylate, and a (meth)acrylic acid.

18. The support material of claim 17, wherein the ethylenically-unsaturated aromatic monomer comprises styrene, the alkyl(meth)acrylate comprises n-butyl acrylate, and the (meth)acrylic acid comprises methacrylic acid.

19. The method of claim 16, wherein the support material has a glass transition temperature ranging from about 100° C. to about 115° C.

20. The method of claim 16, wherein the powder form of the support material has a D50 particle size ranging from about 5 micrometers to about 30 micrometers, and a D90/D50 particle size distribution and a D50/D10 particle size distribution each ranging from about 1.00 to about 1.40.

* * * * *

UNITED STATES PATENT AND TRADEMARK OFFICE
CERTIFICATE OF CORRECTION

PATENT NO. : 9,029,058 B2
APPLICATION NO. : 13/944478
DATED : May 12, 2015
INVENTOR(S) : Martin Page 1 of 1

It is certified that error appears in the above-identified patent and that said Letters Patent is hereby corrected as shown below:

On the title page item [75]

For Trevor I. Martin, delete "CA (US)" and insert --(CA)--

Signed and Sealed this
First Day of March, 2016

Michelle K. Lee
*Director of the United States Patent and Trademark Office*